United States Patent
Gorokhov et al.

(10) Patent No.: US 10,805,038 B2
(45) Date of Patent: *Oct. 13, 2020

(54) PUNCTURING SIGNALING CHANNEL FOR A WIRELESS COMMUNICATION SYSTEM

(71) Applicant: QUALCOMM Incorporated, San Diego, CA (US)

(72) Inventors: Alexei Yurievitch Gorokhov, San Diego, CA (US); Min Dong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/955,980

(22) Filed: Jul. 31, 2013

(65) Prior Publication Data

US 2013/0315200 A1    Nov. 28, 2013

Related U.S. Application Data

(63) Continuation of application No. 11/260,931, filed on Oct. 27, 2005, now Pat. No. 8,565,194.

(51) Int. Cl.
*H04L 1/00* (2006.01)
*H04B 1/7103* (2011.01)
(Continued)

(52) U.S. Cl.
CPC .......... *H04L 1/001* (2013.01); *H04B 1/7103* (2013.01); *H04L 1/1607* (2013.01);
(Continued)

(58) Field of Classification Search
CPC ..... H04L 1/001; H04L 5/0048; H04L 5/0094; H04L 1/1607; H04L 5/0044; H04L 5/0007; H04L 5/0016; H04B 1/7103
See application file for complete search history.

(56) References Cited

U.S. PATENT DOCUMENTS 4,393,276 A    7/1983   Steele
4,554,668 A    11/1985  Deman et al.
(Continued)

FOREIGN PATENT DOCUMENTS

CA    2348137    11/2001
CA    2477536    9/2003
(Continued)

OTHER PUBLICATIONS

3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
(Continued)

*Primary Examiner* — Andrew Lai
*Assistant Examiner* — Chuong M Nguyen
(74) *Attorney, Agent, or Firm* — Holland & Hart LLP

(57) ABSTRACT

A signaling channel that punctures traffic channels is used to send signaling, e.g., acknowledgments (ACKs). To send signaling, resources for the signaling channel are determined, e.g., based on a frequency hopping pattern. Signaling is spread with a spreading code (e.g., a Walsh code) to generate spread signaling, which is mapped to the resources for the signaling channel. Each resource may be partitioned into multiple clusters. A signaling message may be mapped to different clusters to achieve diversity. Traffic data may also be mapped to other resources for a traffic channel assigned for use. Traffic data mapped to the other resources for the signaling channel is punctured. The mapped signaling and traffic data are further processed (e.g., for OFDM or SC-FDMA) and transmitted.

20 Claims, 15 Drawing Sheets

(51) Int. Cl.
*H04L 1/16* (2006.01)
*H04L 5/00* (2006.01)
(52) U.S. Cl.
CPC .......... *H04L 5/0044* (2013.01); *H04L 5/0048* (2013.01); *H04L 5/0094* (2013.01); *H04L 5/0007* (2013.01); *H04L 5/0016* (2013.01)

(56) References Cited

U.S. PATENT DOCUMENTS

| | | |
|---|---|---|
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,410 A | 1/1995 | Kettner |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,469,471 A | 11/1995 | Wheatley, III |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,903,546 A * | 5/1999 | Ikeda ................ H04L 1/0054 348/E5.108 |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,002,942 A | 12/1999 | Park |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng |
| 6,075,797 A | 6/2000 | Thomas |
| 6,076,114 A | 6/2000 | Wesley |
| 6,088,345 A | 7/2000 | Sakoda et al. |
| 6,088,592 A | 7/2000 | Doner et al. |
| 6,108,323 A | 8/2000 | Gray |
| 6,108,550 A | 8/2000 | Wiorek et al. |
| 6,112,094 A | 8/2000 | Dent |
| 6,128,776 A | 10/2000 | Kang |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,229,795 B1 | 5/2001 | Pankaj et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,393,295 B1 | 5/2002 | Butler et al. |
| 6,401,062 B1 | 6/2002 | Murashima |
| 6,438,369 B1 | 8/2002 | Huang et al. |
| 6,449,246 B1 | 9/2002 | Barton et al. |
| 6,456,604 B1 | 9/2002 | Lee et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,546,248 B1 | 4/2003 | Jou et al. |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,628,673 B1 | 9/2003 | McFarland et al. |
| 6,636,568 B2 | 10/2003 | Kadous |
| 6,654,339 B1 | 11/2003 | Bohnke; Ralf et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,662,024 B2 | 12/2003 | Walton et al. |
| 6,674,787 B1 | 1/2004 | Dick et al. |
| 6,674,810 B1 | 1/2004 | Cheng |
| 6,675,012 B2 | 1/2004 | Gray |
| 6,678,318 B1 | 1/2004 | Lai |
| 6,690,951 B1 | 2/2004 | Cuffaro et al. |
| 6,693,952 B1 | 2/2004 | Chuah et al. |

(56) References Cited

U.S. PATENT DOCUMENTS

| | | |
|---|---|---|
| 6,694,147 B1 | 2/2004 | Viswanath et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,807,146 B1 | 10/2004 | McFarland |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,907,270 B1 | 6/2005 | Blanz |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,928,062 B2 | 8/2005 | Krishnan et al. |
| 6,934,266 B2 | 8/2005 | Dulin et al. |
| 6,934,275 B1 | 8/2005 | Love et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,940,917 B2 | 9/2005 | Menon et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,027,523 B2 | 4/2006 | Jalali et al. |
| 7,031,742 B2 | 4/2006 | Chen et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,047,016 B2 | 5/2006 | Walton et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 * | 12/2006 | Palenius .......... H04B 1/7103 370/335 |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,876 B2 | 1/2007 | Wei et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,212,564 B2 | 5/2007 | Parizhsky et al. |
| 7,215,979 B2 | 5/2007 | Nakagawa et al. |
| 7,221,680 B2 | 5/2007 | Vijayan et al. |
| 7,230,941 B2 | 6/2007 | Odenwalder et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |

(56) References Cited

U.S. PATENT DOCUMENTS

| | | |
|---|---|---|
| 7,260,153 B2 | 8/2007 | Nissani (Nissensohn) |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,302,009 B2 | 11/2007 | Walton et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,346,018 B2 | 3/2008 | Holtzman et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,470 B2 | 7/2008 | Lane et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,241 B2 | 8/2008 | Bao et al. |
| 7,418,246 B2 | 8/2008 | Kim et al. |
| 7,420,939 B2 | 9/2008 | Laroia et al. |
| 7,423,991 B2 | 9/2008 | Cho et al. |
| 7,426,426 B2 | 9/2008 | Van Baren |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen |
| 7,450,532 B2 | 11/2008 | Chae et al. |
| 7,450,548 B2 | 11/2008 | Haustein et al. |
| 7,453,801 B2 | 11/2008 | Taneja et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,477,618 B2 | 1/2009 | Chen et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,512,412 B2 | 3/2009 | Mese et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim |
| 7,623,442 B2 | 11/2009 | Laroia et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,706,350 B2 | 4/2010 | Gorokhov et al. |
| 7,724,777 B2 | 5/2010 | Sutivong et al. |
| 7,768,979 B2 | 8/2010 | Sutivong et al. |
| 7,813,322 B2 | 10/2010 | Laroia et al. |
| 7,852,746 B2 | 12/2010 | Jalali |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,031,583 B2 | 10/2011 | Classon et al. |
| 8,045,512 B2 | 10/2011 | Khandekar et al. |
| 8,077,692 B2 | 12/2011 | Khandekar et al. |
| 8,095,141 B2 | 1/2012 | Teague et al. |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,295,154 B2 | 10/2012 | Laroia et al. |
| 8,331,463 B2 | 12/2012 | Jayaraman et al. |
| 8,400,979 B2 | 3/2013 | Smee et al. |
| 8,446,892 B2 | 5/2013 | Ji et al. |
| 8,462,859 B2 | 6/2013 | Sampath et al. |
| 8,477,684 B2 | 7/2013 | Khandekar et al. |
| 8,565,194 B2 * | 10/2013 | Gorokhov ............ H04B 1/7103 370/335 |
| 8,831,607 B2 | 9/2014 | Borran et al. |
| 2001/0021180 A1 | 9/2001 | Lee et al. |
| 2001/0021650 A1 | 9/2001 | Bilgic |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055293 A1 | 12/2001 | Parsa et al. |
| 2001/0055294 A1 | 12/2001 | Motoyoshi |
| 2001/0055297 A1 | 12/2001 | Benveniste |
| 2002/0000948 A1 | 1/2002 | Chun et al. |
| 2002/0003792 A1 | 1/2002 | Schmidl et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0085641 A1 * | 7/2002 | Baum ...................... H04L 1/04 375/260 |
| 2002/0090004 A1 | 7/2002 | Rinchiuso |
| 2002/0090024 A1 * | 7/2002 | Tan ........................ H04B 1/707 375/146 |
| 2002/0101839 A1 | 8/2002 | Farley et al. |
| 2002/0122381 A1 | 9/2002 | Wu et al. |
| 2002/0122383 A1 | 9/2002 | Wu et al. |
| 2002/0122400 A1 | 9/2002 | Vayanos et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0172308 A1 | 11/2002 | Harel et al. |
| 2002/0176398 A1 | 11/2002 | Nidda |
| 2002/0181571 A1 | 12/2002 | Yamano et al. |
| 2002/0191569 A1 | 12/2002 | Sung et al. |

(56) References Cited

U.S. PATENT DOCUMENTS

| | | |
|---|---|---|
| 2002/0193146 A1 | 12/2002 | Wallace et al. |
| 2003/0002464 A1 | 1/2003 | Rezaiifar et al. |
| 2003/0003880 A1 | 1/2003 | Ling et al. |
| 2003/0020651 A1 | 1/2003 | Crilly, Jr. et al. |
| 2003/0026219 A1* | 2/2003 | Moon .................. H04B 1/707 370/318 |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076878 A1 | 4/2003 | Jones et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0157900 A1 | 8/2003 | Gaal et al. |
| 2003/0161281 A1 | 8/2003 | Dulin et al. |
| 2003/0161282 A1 | 8/2003 | Medvedev et al. |
| 2003/0161821 A1 | 8/2003 | Santana Ribeiro |
| 2003/0165189 A1 | 9/2003 | Kadous |
| 2003/0181170 A1 | 9/2003 | Sim |
| 2003/0181212 A1* | 9/2003 | Wentink .................. H04L 47/14 455/450 |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun |
| 2003/0220101 A1 | 11/2003 | Castrogiovanni et al. |
| 2003/0223452 A1 | 12/2003 | Toskala et al. |
| 2003/0224798 A1 | 12/2003 | Willenegger et al. |
| 2003/0228850 A1 | 12/2003 | Hwang |
| 2003/0235255 A1 | 12/2003 | Ketchum et al. |
| 2003/0236080 A1 | 12/2003 | Kadous et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi |
| 2004/0010623 A1 | 1/2004 | Sher et al. |
| 2004/0015692 A1 | 1/2004 | Green et al. |
| 2004/0017785 A1 | 1/2004 | Zelst |
| 2004/0032443 A1 | 2/2004 | Moylan et al. |
| 2004/0037235 A1 | 2/2004 | Kadous |
| 2004/0038697 A1 | 2/2004 | Attar et al. |
| 2004/0042558 A1 | 3/2004 | Hwang et al. |
| 2004/0048609 A1 | 3/2004 | Kosaka |
| 2004/0048630 A1 | 3/2004 | Shapira |
| 2004/0054999 A1 | 3/2004 | Willen et al. |
| 2004/0057394 A1 | 3/2004 | Holtzman |
| 2004/0058687 A1 | 3/2004 | Kim et al. |
| 2004/0066754 A1 | 4/2004 | Hottinen |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0081195 A1 | 4/2004 | El-Maleh et al. |
| 2004/0086055 A1 | 5/2004 | Li |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1* | 7/2004 | Kim .................. H04B 7/2628 370/335 |
| 2004/0136349 A1 | 7/2004 | Walton et al. |
| 2004/0141548 A1 | 7/2004 | Shattil |
| 2004/0156328 A1 | 8/2004 | Walton et al. |
| 2004/0160914 A1 | 8/2004 | Sarkar |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190486 A1 | 9/2004 | Oshiba |
| 2004/0190640 A1 | 9/2004 | Dubuc et al. |
| 2004/0202257 A1 | 10/2004 | Mehta et al. |
| 2004/0203347 A1 | 10/2004 | Nguyen |
| 2004/0203455 A1* | 10/2004 | Bao .................. H04L 1/0021 455/67.13 |
| 2004/0208138 A1 | 10/2004 | Hayashi et al. |
| 2004/0218520 A1 | 11/2004 | Aizawa |
| 2004/0219819 A1 | 11/2004 | Di Mascio |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |

(56) References Cited

U.S. PATENT DOCUMENTS

| | | |
|---|---|---|
| 2005/0030964 A1 | 2/2005 | Tiedemann, Jr. et al. |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041750 A1 | 2/2005 | Lau |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073973 A1 | 4/2005 | Laroia et al. |
| 2005/0073976 A1 | 4/2005 | Fujii |
| 2005/0075073 A1 | 4/2005 | Kadous et al. |
| 2005/0084000 A1 | 4/2005 | Krauss et al. |
| 2005/0085195 A1 | 4/2005 | Tong et al. |
| 2005/0085197 A1 | 4/2005 | Laroia et al. |
| 2005/0085236 A1 | 4/2005 | Gerlach et al. |
| 2005/0088959 A1 | 4/2005 | Kadous |
| 2005/0105640 A1* | 5/2005 | Han ................ H04L 1/1671 375/295 |
| 2005/0111397 A1 | 5/2005 | Attar et al. |
| 2005/0113100 A1 | 5/2005 | Oprescu-Surcobe et al. |
| 2005/0120097 A1 | 6/2005 | Walton et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0138671 A1 | 6/2005 | Love et al. |
| 2005/0141624 A1 | 6/2005 | Lakshmipathi et al. |
| 2005/0147024 A1 | 7/2005 | Jung et al. |
| 2005/0147025 A1 | 7/2005 | Auer |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0180315 A1* | 8/2005 | Chitrapu ............ H04B 7/2628 370/208 |
| 2005/0181799 A1* | 8/2005 | Laroia ................ H04L 5/0055 455/450 |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1* | 9/2005 | Krishnan ............ H04W 92/18 455/41.2 |
| 2005/0215251 A1 | 9/2005 | Krishnan et al. |
| 2005/0226204 A1 | 10/2005 | Uehara |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0286465 A1 | 12/2005 | Zhuang |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034163 A1 | 2/2006 | Gore et al. |
| 2006/0034164 A1 | 2/2006 | Ozluturk |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146867 A1 | 7/2006 | Lee et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0193298 A1* | 8/2006 | Kishigami ............ H04B 7/01 370/338 |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |

(56) References Cited

U.S. PATENT DOCUMENTS

| | | |
|---|---|---|
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0011550 A1 | 1/2007 | Agrawal et al. |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Khandekar et al. |
| 2007/0098120 A1 | 5/2007 | Wang |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0211668 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2577369 | 3/2006 |
| CL | 19931400 | 12/1994 |
| CL | 8461997 | 1/1998 |
| CL | 22892004 | 9/2005 |
| CL | 30862004 | 10/2005 |
| CL | 14922006 | 4/2007 |
| CL | 14892006 | 5/2007 |
| CL | 14902006 | 5/2007 |
| CL | 29062006 | 5/2007 |
| CN | 1252919 | 5/2000 |
| CN | 1256036 A | 6/2000 |
| CN | 1284795 | 2/2001 |
| CN | 1296682 | 5/2001 |
| CN | 1344451 A | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1115808 C | 7/2003 |
| CN | 1449630 A | 10/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1642051 A | 7/2005 |
| CN | 1642335 A | 7/2005 |
| CN | 1642350 A | 7/2005 |
| CN | 1647436 | 7/2005 |
| CN | 1656738 A | 8/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0740431 A1 | 10/1996 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0976207 A1 | 2/2000 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |

(56) References Cited

FOREIGN PATENT DOCUMENTS

| | | |
|---|---|---|
| EP | 1093241 A1 | 4/2001 |
| EP | 1166481 A2 | 1/2002 |
| EP | 1172983 A2 | 1/2002 |
| EP | 1180907 A2 | 2/2002 |
| EP | 1187506 A1 | 3/2002 |
| EP | 1204217 A1 | 5/2002 |
| EP | 1255369 | 11/2002 |
| EP | 1267513 | 12/2002 |
| EP | 1074099 B1 | 2/2003 |
| EP | 1286490 A2 | 2/2003 |
| EP | 1335504 A2 | 8/2003 |
| EP | 1351538 A1 | 10/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 A2 | 3/2005 |
| EP | 1531575 A2 | 5/2005 |
| EP | 1533950 A1 | 5/2005 |
| EP | 1542488 A1 | 6/2005 |
| EP | 1601149 A2 | 11/2005 |
| EP | 1643669 A1 | 4/2006 |
| EP | 1538863 A1 | 6/2006 |
| EP | 1898542 A1 | 3/2008 |
| FR | 2584884 | 1/1987 |
| GB | 2279540 A | 1/1995 |
| GB | 2348776 A | 10/2000 |
| GB | 2412541 | 9/2005 |
| IL | 201872 | 5/2012 |
| JP | H04111544 A | 4/1992 |
| JP | 4301931 A | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000022618 A | 1/2000 |
| JP | 2000102065 A | 4/2000 |
| JP | 2000184425 | 6/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 A | 2/2004 |
| JP | 200472457 | 3/2004 |
| JP | 2004072157 A | 3/2004 |
| JP | 2004096142 | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 A | 9/2004 |
| JP | 2004297276 A | 10/2004 |
| JP | 2004297370 A | 10/2004 |
| JP | 2004297756 | 10/2004 |
| JP | 2005006337 | 1/2005 |
| JP | 2005020530 | 1/2005 |
| JP | 2005502218 A | 1/2005 |
| JP | 2005506757 A | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006506860 A | 2/2006 |
| JP | 2006211537 A | 8/2006 |
| JP | 2006524930 A | 11/2006 |
| JP | 2007519281 | 7/2007 |
| JP | 2007520309 A | 7/2007 |
| JP | 2007527127 | 9/2007 |
| JP | 2008505587 A | 2/2008 |
| JP | 2008535398 | 8/2008 |
| JP | 4188372 B2 | 11/2008 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050043302 A | 5/2005 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 | 10/2002 |
| RU | 2197778 C2 | 1/2003 |

(56) References Cited

FOREIGN PATENT DOCUMENTS

| | | |
|---|---|---|
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 C1 | 10/2004 |
| RU | 2242091 C2 | 12/2004 |
| RU | 2267224 | 12/2005 |
| RU | 2285351 C2 | 10/2006 |
| RU | 2335864 C2 | 10/2008 |
| RU | 2349043 C2 | 3/2009 |
| SU | 1320883 | 6/1987 |
| TW | 510132 | 11/2002 |
| TW | 200401572 | 1/2004 |
| TW | I232040 | 5/2005 |
| TW | 248266 | 1/2006 |
| TW | 200718128 | 5/2007 |
| WO | WO-9408432 | 4/1994 |
| WO | WO-9613920 A1 | 5/1996 |
| WO | WO-9701256 | 1/1997 |
| WO | WO-9737456 A2 | 10/1997 |
| WO | WO-9746033 A2 | 12/1997 |
| WO | WO-9800946 A2 | 1/1998 |
| WO | WO-98014026 | 4/1998 |
| WO | WO-9837706 A2 | 8/1998 |
| WO | WO-9848581 A1 | 10/1998 |
| WO | WO-9853561 | 11/1998 |
| WO | WO-9941871 A1 | 8/1999 |
| WO | WO-9944383 A1 | 9/1999 |
| WO | WO-99044313 | 9/1999 |
| WO | WO-9952250 A1 | 10/1999 |
| WO | WO-9953713 | 10/1999 |
| WO | WO-9960729 A1 | 11/1999 |
| WO | WO-99059265 | 11/1999 |
| WO | WO-0002397 | 1/2000 |
| WO | WO-0004728 | 1/2000 |
| WO | WO-0033503 | 6/2000 |
| WO | 0051389 A1 | 8/2000 |
| WO | WO-0070897 | 11/2000 |
| WO | WO-0126269 A1 | 4/2001 |
| WO | WO-0139523 A2 | 5/2001 |
| WO | WO-01045300 | 6/2001 |
| WO | WO-0158054 A1 | 8/2001 |
| WO | WO-0165637 A2 | 9/2001 |
| WO | WO-0169814 A1 | 9/2001 |
| WO | WO-0182543 | 11/2001 |
| WO | WO-0189112 A1 | 11/2001 |
| WO | WO-0195427 A2 | 12/2001 |
| WO | WO-200193505 | 12/2001 |
| WO | WO-0204936 A1 | 1/2002 |
| WO | WO-2002007375 | 1/2002 |
| WO | 0215432 A1 | 2/2002 |
| WO | WO-2002015616 | 2/2002 |
| WO | WO-0219746 A1 | 3/2002 |
| WO | WO-0231991 | 4/2002 |
| WO | WO-0233848 A2 | 4/2002 |
| WO | WO-0245293 A2 | 6/2002 |
| WO | WO-0245456 A2 | 6/2002 |
| WO | WO-0249305 A2 | 6/2002 |
| WO | WO-0249306 A2 | 6/2002 |
| WO | WO-0249385 A2 | 6/2002 |
| WO | WO-02082689 A2 | 10/2002 |
| WO | WO-02082743 A2 | 10/2002 |
| WO | WO-02100027 A1 | 12/2002 |
| WO | WO-03001981 A2 | 1/2003 |
| WO | WO-03003617 | 1/2003 |
| WO | WO-03019819 A1 | 3/2003 |
| WO | WO-03030414 | 4/2003 |
| WO | WO-03034644 A1 | 4/2003 |
| WO | WO-03043262 | 5/2003 |
| WO | WO-2003043369 | 5/2003 |
| WO | 03049409 A2 | 6/2003 |
| WO | WO-03069816 A2 | 8/2003 |
| WO | WO-03069832 A1 | 8/2003 |
| WO | WO-03085876 | 10/2003 |
| WO | WO-03088538 A1 | 10/2003 |
| WO | WO-04004370 | 1/2004 |
| WO | WO-2004008671 | 1/2004 |
| WO | WO-2004008681 A1 | 1/2004 |
| WO | WO-04016007 | 2/2004 |
| WO | WO-2004023834 A1 | 3/2004 |
| WO | WO-2004028037 A1 | 4/2004 |
| WO | WO-2004030238 A1 | 4/2004 |
| WO | WO-2004032443 A1 | 4/2004 |
| WO | WO-2004038972 A1 | 5/2004 |
| WO | WO-2004038984 A2 | 5/2004 |
| WO | WO-2004040690 A2 | 5/2004 |
| WO | WO-2004047354 | 6/2004 |
| WO | WO-2004049618 A1 | 6/2004 |
| WO | WO-2004051872 A2 | 6/2004 |
| WO | WO-2004056022 A2 | 7/2004 |
| WO | WO-2004062255 | 7/2004 |
| WO | WO-04073276 | 8/2004 |
| WO | WO-2004068721 A2 | 8/2004 |
| WO | WO-2004075442 | 9/2004 |
| WO | WO-2004077850 A2 | 9/2004 |
| WO | WO-2004084450 A2 | 9/2004 |
| WO | WO-2004086706 A1 | 10/2004 |
| WO | WO-2004086711 | 10/2004 |
| WO | WO-2004095730 A1 | 11/2004 |
| WO | WO-2004095854 | 11/2004 |
| WO | WO-2004098072 A2 | 11/2004 |
| WO | WO-2004098222 | 11/2004 |
| WO | WO-2004105272 A1 | 12/2004 |
| WO | WO-2004114549 A1 | 12/2004 |
| WO | WO-2004114564 A1 | 12/2004 |
| WO | WO-2004114615 A1 | 12/2004 |
| WO | WO-2005002253 A1 | 1/2005 |
| WO | WO-05015797 | 2/2005 |
| WO | WO-2005011163 A1 | 2/2005 |
| WO | WO-2005015795 A1 | 2/2005 |
| WO | WO-2005015810 | 2/2005 |
| WO | WO-2005020488 A1 | 3/2005 |
| WO | WO-2005025110 A2 | 3/2005 |
| WO | WO-2005032004 A1 | 4/2005 |
| WO | WO-2005043780 A1 | 5/2005 |
| WO | WO-2005046080 | 5/2005 |
| WO | WO-2005055465 A1 | 6/2005 |
| WO | WO-2005055484 A1 | 6/2005 |
| WO | WO-2005065062 A2 | 7/2005 |
| WO | WO-2005069538 A1 | 7/2005 |
| WO | WO-2005074155 A1 * | 8/2005 |
| WO | WO-2005086440 A1 | 9/2005 |
| WO | WO-2006007292 A2 | 1/2006 |
| WO | WO-2006062356 A1 | 6/2006 |
| WO | WO-2006077696 | 7/2006 |
| WO | WO-2006134032 | 12/2006 |
| WO | WO-2007022430 A2 | 2/2007 |

OTHER PUBLICATIONS

3rd Generation Partnership Project; Technical Specification Group Radio Access Network; Physical Layer Aspects for Evolved UTRA (Release 7), 3GPP TR 25814 v031 (Nov. 2005), pp. 1-57.

Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; Apr. 3, 2007, Apr. 3, 2007 (Apr. 3, 2007), XP050105640 [retrieved on Apr. 3, 2007].

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.

(56) References Cited

OTHER PUBLICATIONS

Bahai, Saltzberg: "System Architecture," Multi-Carrier Digital Communications, Kluwer Academic, New York, NY, XP-002199501, 1999, pp. 17-21.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Bhushan N., "UHDR Overview", C30-20060522-037, Denver, CO, May 22, 2006, pp. 1-115.
Bingham: "Other Types of MCM," ADSL, VDSL, and Multicarrier Modulation, John Wiley & Sons, New York, XP-002199502. 2000, pp. 111-113.
Blum, R. et al., "On Optimum MIMO with Antenna Selection," IEEE International Conference on Communications: Conference Proceedings, vol. 1, Apr. 28, 2002, pp. 386-390.
Catreux, S. et al., "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/ie15/7153/19260/00891306.pdf"tp=&isnumber=19260&arnumber=8913063&punumber=7153.
Chennakeshu, et al. "Capacity Analysis of a TDMA-Based Slow-Frequency-Hopped Cellular System," IEEE Transaction on Vehicular Technology, vol. 45., No. 3, Aug. 1, 1996, pp. 531-542, XP000612951.
Chiani, et al., "Outage Evaluation for Slow Frequency-Hopping Mobile Radio Systems" IEEE Transactions on Communications, vol. 47, No. 12 Dec. 1999, pp. 1865-1874.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Chung, S. et al., "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Dai, Y. et al., "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.
Das et al., "On the Reverse Link Interference Structure for Next Generation Cellular Systems," Global Telecommunications Conference, 2004. GLOBECOM '04, IEEE, vol. 5 IEEE Nov.29-Dec. 3, 2004, pp. 3068-3072.
Dierks, et al., "The TLS Protocol", Version 1.0, Network Working Group, Request for Comments 2246, pp. 1-80 (Jan. 1999).
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Dinis, R. et al.: "A Multiple Access Scheme for the Uplink of Broadband Wireless Systems," Global Telecommunications Conference, 2004. GLOBECOM "04. IEEE Dallas, TX, USA Nov. 29-Dec. 3, 2004, vol. 6, pp. 3808-3812, XP010758449 Piscataway, NJ, USA, IEEE.
Don Torrieri, "Cellular Frequency-Hopping CDMA Systems," IEEE Vehicular Technology Conference, May 16, 1999 (May 16, 1999), pp. 919-925, vol. 2.
El Gamal, H. et al., "Universal Space-Time Coding," IEEE Transactions on Information Theory, vol. 49, Issue 5, pp. 1097-1119, XP011074756, ISSN: 0018-9448, May 2003.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, pp. 1121-1124, Mar. 18-23, 2005.
Groe, J., et al., "CDMA Mobile Radio Design," Sep. 26, 2001, Artech House, Inc. Norwood, MA, pp. 257-259.
Guo, K. et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.
International Search Report—PCT/US06/060291, International Search Authority—European Patent Office—dated May 3, 2007.
"Introduction to cdma2000 Standards for Spread Spectrum Systems",TIA/EIA/IS-2000 Standards for CDMA2000 Spread Spectrum Systems 3GPP2 C.S0001-0 Version 1.0, Jul. 1999, 16 pages.
Jim Tomcik, "MBFDD and MBTDD Wideband Mode: Technology Overview", IEEE C802.20-05/68r1, Jan. 6, 2006.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/C802.20-05-68.zip.
John B. Groe, Lawrence E. Larson, "CDMA Mobile Radio Design" Sep. 26, 2001 (Sep. 26, 2001), Artech House, Norwood, MA02062 580530, XP002397967, pp. 157-159.
J.S. Chow and J.M. Cioffi: "A cost-effective maximum likelihood reciever for multicarrier systems", Proc. IEEE Int. Conf. on Comm., pp. 948-952, Jun. 1992.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, Mar. 11, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Ken Murakami et al., "Status Toward Standardization at IEEE 802.3ah and items on the construction of GE-PON system ," Technical Report of the Institute of Electronics, Information and Communication Engineers, Jun. 13, 2003, vol. 103, No. 124, pp. 1-6, IN2003-24.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kim, et al. "Performance of TDMA System With SFH and 2-Bit Differentially Detected GMSK Over Rayleigh Fading Channel," IEEE Vehicular Technology Conference, Apr. 28, 1996 (Apr. 28, 1996), pp. 789-794.

(56) References Cited

OTHER PUBLICATIONS

Kishiyama et al., Investigation of optimum pilot channel structure for VSF-OFCDM broadband wireless access in forward link, VTC 2003-Spring, The 57th IEEE Semiannual Vehicular Technology Conference, Proceedings Jeju, Korea, Apr. 22-25, 2003, pp. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999 (May 16, 1999), pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Kousa, M. et al., "Adaptive Binary Coding for Diversity Communication Systems" IEEE International Conference on Personal Wireless Communications Proceedings, pp. 80-84, XP000992269, (1997).
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004 (Sep. 2004), pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004 (Jan. 2004), pp. 62-70, XP001189908.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
LG Electronics: "Papr comparison of uplink MA schemes", 3GPP TSG RAN WG1 Meeting #41, R1-050475, May 9-13, 2005, pp. 6.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany June 24-26, 2004. Piscataway, NJ, USA IEEE, Jun. 24, 2004, pp. 143-148, XP010782619, ISBN 0789385136, Para 3, point B.
Molisch, et al., MIMO systems with antenna selection, IEEE Microwave Magazine, Mar. 2004, pp. 46-56, XP002411128.
Motorola,"Uplink Numerology and Frame Structure", 3GPP TAG RAN1 #41 Meeting R1-050397, May 13, 2005.
Naofal Al-Dhahir: "A Bandwidth-Optimized Reduced-Complexity Equalized Multicarrier Transceiver", IEEE Transactions on Communications, vol. 45, No. 8, Aug. 1997, pp. 1-17.
Naofal Al-Dhahir: "Optimum Finite-Length Equalization for Multicarrier Transceivers", IEEE Trans. on Comm., pp. 56-64, Jan. 1996.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.

Natarajan, et al., "High-Performance MC-CDMA via Carrier Interferometry Codes," IEEE Transactions on Vehicular Technology, 2001, vol. 50 (issue 6) pp. 1344-1353.
Nokia: "Compact signalling of multi-code allocation for HSDPA", version 2,3GPP R1-02-0018, Jan. 11, 2002.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-9.
NTT DoCoMo, et al., "Orthogonal Common Pilot Channel and Scrambling Code in Evolved UTRA Downlink," 3GPP TSG RAN WG1 #42 on LTE (Original R1-050589), R1-050704, London UK, pp. 1-8, Aug. 29-Sep. 2, 2005.
Physical Channels and Multiplexing in Evolved UTRA Downlink TSG-RAN Working Group 1 Meeting, XX, XX, vol. RI-050590, Jun. 20, 2005 (Jun. 20, 2005), pp. 1-24, XP003006923 the whole document.
Prasad, N. et al., "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
QUALCOMM Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, No. San Diego, USA; Oct. 4, 2005, Oct. 4, 2005, pp. 1-10, XP050100715.
Rohling, H et al., "Performance Comparison of Different Multiple Access Schemes for the Downlink of an OFDM Communication System", Vehicular Technology Conference, 1997, 47th IEEE, vol. 3, May 3-7, 1997, pp. 1365-1369.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.
Samsung Electonics Co. Ltd.; "Uplink Multiple Access and Multiplexing for Evolved UTRA", R1-050439, May 3, 2005 (May 3, 2005), pp. 1-22, XP55018616, Retrieved from the Internet: URL:http://www.3gpp.org/ftp/tsg_ran/WG1_R1/TSGR1 / DOCS / [retrieved on Feb. 7, 2012].
Samsung: "Uplink Transmission and Multiplexing for EUTRA", 3GPP Draft; R1-050605 UL Multiplexing, Jun. 16, 2005, XP050111420.
Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM "93., IEEE, Nov. 29, 1993, pp. 1749-1753, vol. 3.
Sari, et al., "Transmission Techniques for Digital Terrestrial TV Broadcasting," IEEE Communications Magazine, Feb. 1995, pp. 100-109.
Schnell, et al., "Application of IFDMA to Mobile Radio Transmission", IEEE 1998 International Conference on Universal Personal Communications, vol. 2, Oct. 5-9, 1998, pp. 1267-1272.
Schnell, M. et al., "A Promising New Wideband Multiple-Access Scheme for Future Mobile Communications Systems", European Transactions on Telecommunications, Jul. 1, 1999, vol. 10, No. 4, pp. 417-427, Wiley & Sons, Chichester, GB, XP009069928, ISSN: 1 124-318X.
Sethi M, et al., "Code Reuse DS-CDMA- A Space Time Approach", Proceedings of the 2002 IEEE International Conference on Acoustics, Speech, and Signal Processing (ICASSP), pp. 2297-2300, May 13-17, 2002.
Shattil et al., "Array Control Systems for Multicarrier Protocols Using a Frequency-Shifted Feedback Cavity", Radio and Wireless Conference EEE, Aug. 1-4, 1999, pp. 215-218.

(56) References Cited

OTHER PUBLICATIONS

Siemens, "Evolved UTRA uplink scheduling and frequency reuse" [online], 3GPP TSG-RAN WG1 #41 R1-050476, Internet <URL:http://www.3gpp.org/ftp/tsg_ran/WG1_RL1/TSGR1_41/Docs/R1-050476.zip>, May 9, 2005.

Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.

Sorger U., et al., "Interleaved FDMA-a new spread-spectrum multiple-access scheme" Communications, 1998. ICC 98. Conference Record. 1998 IEEE Internation AL Conference on Atlanta, GA, USA Jun. 7-11, 1998, New York, NY, USA, IEEE, US, vol. 2, Jun. 7, 1998 (Jun. 7 1998), pp. 1013-1017, XP010284733 ISBN: 978-0-7803-4788-5.

Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.

Tachikawa (Editor); "W-CDMA Mobile Communication Systems," John Wiley & Sons Ltd., Japan, Maruzen: pp. 82-213, Jun. 25, 2001.

Taiwanese Search report—095139878—TIPO—dated Nov. 8, 2010.

Telecommunications Industry Association, Mobile Station-Base Station Compatibility Standard for Dual-Mode Wideband Spread Spectrum Cellular System, TIA/EIA-95, Jul. 1993, 668 pages.

Tellado, "Multicarrier Modulation with Low Par," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

TIA-1121.001 "Physical Layer for Ultra Mobile Broadband (UMB) Air Interface Specification," 3GPP2 C.S0084-001-0, Version 2.0 (Aug. 2007).

TIA-1121.002 "Medium Access Control Layer for Ultra Mobile Broadband (UMB) Air Interface Specification," 3GPP2 C.S0084-002-0, Version 2.0 (Aug. 2007).

Tomcik, Jim: "QFDD Technology Overview Presentation," IEEE 802.20 Working Group on Mobile Broadband Wireless Access, [Online] Nov. 15, 2005, pp. 1-73, XP002467626.

Tomcik T., "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).

Toufik, I., et al., Channel allocation algorithms for multi-carrier systems, Vehicular Technology Conference 2004, VTC2004-Fall, 2004 IEEE 60th Los Angeles, CA, USA Sep. 16-29, 2004, Piscataway, NJ, USA IEEE, Sep. 26, 2004, pp. 1129-1133, XP010786798.

Viswanath, P. et al, "Opportunistic Beamforming Using Dumb Antennas" IEEE Transactions on Information Theory, IEEE USA, vol. 48, No. 6, Jun. 2002 (Jun. 2002), pp. 1277-1294, XP002314708 ISSN: 0018-9448 abstract right-hand column, paragraph 1.

Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).

Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.

Widdup, B. et al., "A highly-parallel VLSI architecture for a list sphere detector," IEEE International Conference, Paris, France, vol. 5, pp. 2720-2725 (2004).

Wiesel, A., et al., "Efficient implementation of sphere demodulation" Signal Processing Advances in Wireless Communications, 2003. SPAWC 200 3. 4th IEEE Workshop on Rome. Italy Jun. 15-18 2003, Piscataway, NJ, USA, IEEE, US, Jun. 15, 2003, p. 36-40, XP010713463.

Written Opinion—PCT/US06/060291, International Search Authority—European Patent Office, dated May 3, 2007.

Xiaodong, et al., "M-Sequences for OFDM Peak-to-Average Power Ratio Reduction and Error Correction," Electronics Letters, vol. 33, Issue 7, Mar. 27, 1997, pp. 554-555.

Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.

Yun et al., "Performance of an LDPC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.

Zekri, et al., "DMT Signals with Low Peak-to-Average Power Ratio," Proceedings, IEEE International Symposium on Computers and Communications, 1999, Jul. 6-8, 1999, pp. 362-368.

Digital cellular telecommunications system (Phase 2+); General Packet Radio Service (GPRS); Mobile Station (MS)-Base Station System (BSS)interface; Radio Link Control/Medium Access Control (RLC/MAC) protocol(GSM 04.60 version 8.4.1 Release 1999), 3GPP Standard; ETSI EN301349, 3RD Generation Partnership Project (3GPP), Mobile Competence Centre ; 650, Route Des Lucioles ; F-06921 Sophia-Antipolis Cedex ; France, No. V8.4.1, Oct. 1, 2000 (Oct. 1, 2000 ), pp. 1-243, XP050358534.

Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6,1-7,1-16,6-65,7-11,7-33,7-37-7-55,9-21,9-22,9-24-9-32.

Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.

Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999 (Sep. 19, 1999), pp. 1545-1549, XP010353233, DOI: 10.1109/VETECF.1999.801553, ISBN: 978-0-7803-5435-7.

Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

Samsung: "ACK/NACK Signalling Performance", 3GPP Draft, R1-040688_ACKNACK_Signaling, 3rd Generation Partnership Project (3GPP), Mobile Competence Centre, 650, Route Des Lucioles, F-06921 Sophia-Antipolis Cedex, France, vol. RAN WG1, No. Cannes, France; Jun. 21, 2004-Jun. 24, 2004, Jun. 19, 2004 (Jun. 19, 2004), XP050951860, 4 Pages, Retrieved from the Internet: URL:http://www.3gpp.org/ftp/tsg_ran/WG1_RL 1/TSGR1_AH/Rel-6_AH_0406/Docs/ZIPs/ [retrieved on Jun. 19, 2004].

\* cited by examiner

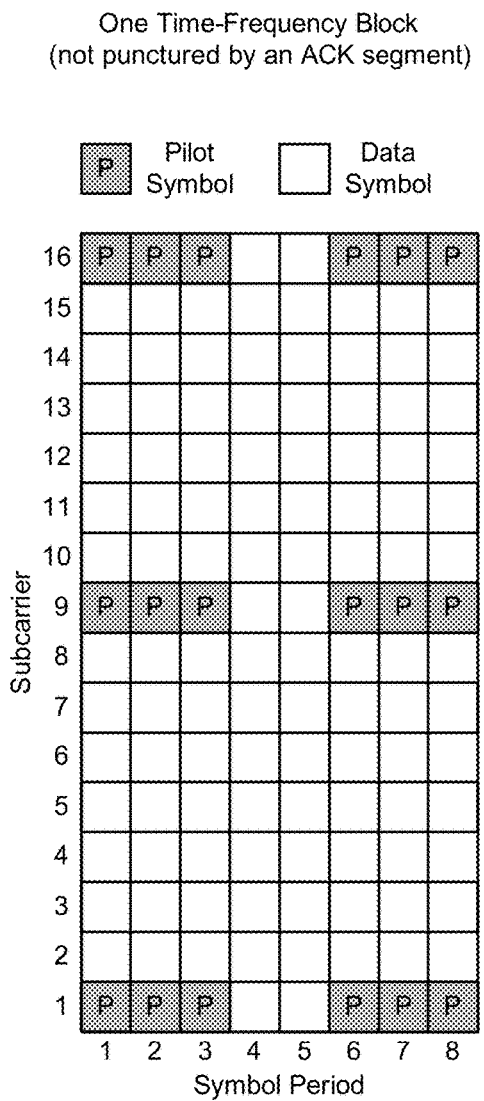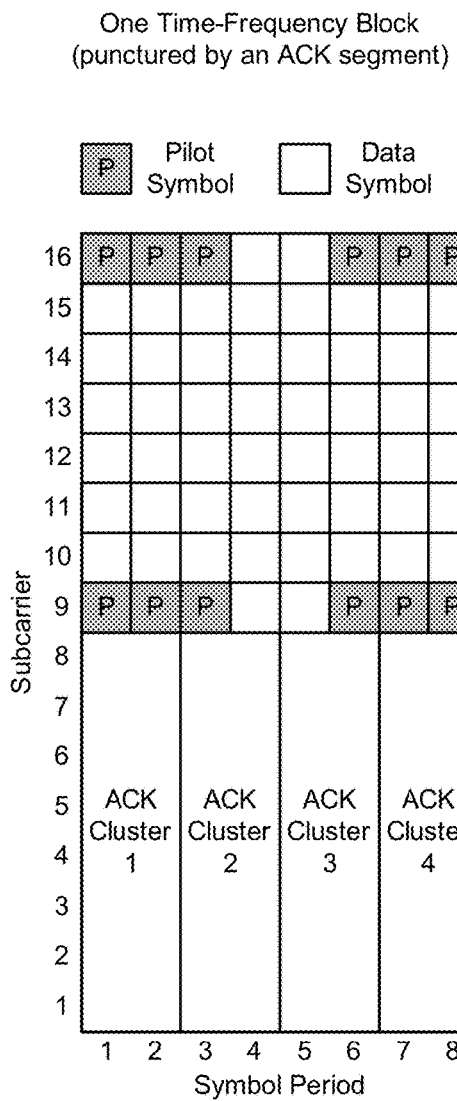
FIG. 7B
FIG. 7C

PUNCTURING SIGNALING CHANNEL FOR A WIRELESS COMMUNICATION SYSTEM

The present application for patent is a continuation of U.S. patent application Ser. No. 11/260,931, entitled "PUNCTURING SIGNALING CHANNEL FOR A WIRELESS COMMUNICATION SYSTEM," filed Oct. 27, 2005, the entire contents of which are incorporated by reference herein.

I. REFERENCE TO CO-PENDING APPLICATIONS FOR PATENT

The present application for patent is related to the following co-pending U.S. patent applications:

U.S. patent application Ser. No. 11/261,806 entitled "Varied Signaling Channels for a Reverse Link in a Wireless Communication System", filed Oct. 27, 2005, assigned to the assignee hereof, and expressly incorporated by reference herein; and U.S. patent application Ser. No. 11/261,836 entitled "Systems And Methods For Control Channel Signaling", filed Oct. 27, 2005, assigned to the assignee hereof, and expressly incorporated by reference herein.

U.S. Provisional Application No. 60/731,013 entitled "Mobile Wireless Access System", filed Oct. 27, 2005, assigned to the assignee hereof, and expressly incorporated by reference herein.

II. FIELD

The present invention relates generally to communication, and more specifically to techniques for transmitting signaling in a communication system.

III. BACKGROUND

Wireless communication systems are widely deployed to provide various communication services such as voice, packet data, broadcast, messaging, and so on. These systems may be multiple-access systems capable of supporting communication for multiple users by sharing the available system resources. Examples of such multiple-access systems include code division multiple access (CDMA) systems, time division multiple access (TDMA) systems, and frequency division multiple access (FDMA) systems.

A communication system may employ a transmission scheme with feedback to improve reliability for data transmission. For example, a transmitter may transmit a data packet to a receiver, which may send back an acknowledgment (ACK) if the packet is decoded correctly or a negative acknowledgment (NAK) if the packet is decoded in error. The transmitter uses the ACK to terminate the transmission of the packet and uses the NAK to retransmit all or a portion of the packet. The transmitter is thus able to transmit just enough data for each packet based on the feedback from the receiver.

A base station in a multiple-access system may concurrently communicate with multiple terminals on the forward and reverse links at any given moment. The forward link (or downlink) refers to the communication link from the base stations to the terminals, and the reverse link (or uplink) refers to the communication link from the terminals to the base stations. The base station may transmit data to multiple terminals on the forward link and may receive ACKs and/or NAKs (or ACK information) from these terminals on the reverse link. The ACK information from the terminals, although beneficial, represent overhead in the system.

There is therefore a need in the art for techniques to efficiently send ACK information in a communication system.

SUMMARY

Techniques for efficiently transmitting signaling in a communication system are described herein. The signaling may be ACK information or some other information. In an embodiment, a signaling channel that punctures traffic channels is used to send signaling. The signaling channel may also be called a control channel, an overhead channel, a feedback channel, and so on. The signaling channel may be mapped to resources, e.g. time-frequency segments, and each traffic channel may be mapped to different resources. Each time-frequency segment and each time-frequency block may be a block of time and frequency. A time-frequency segment and a time-frequency block may have the same or different sizes. The signaling channel punctures the traffic channels in that data is not sent on the traffic channels in the portion of the time-frequency blocks that collide with the time-frequency segments for the signaling channel. Hence, the signaling channel punctures or blanks out the traffic channels whenever collision occurs.

In an embodiment, signaling is sent with code division multiplexing (CDM) on the signaling channel. At a transmitter (e.g., a terminal), the resources, e.g. time-frequency segments, for the signaling channel are initially determined, e.g., based on a frequency hopping pattern for the signaling channel. Signaling is spread with a spreading code (e.g., a Walsh code) to generate spread signaling, which is then mapped to the resources for the signaling channel. In an embodiment, each resource is partitioned into multiple clusters, and a signaling message is mapped to different clusters in multiple resources to achieve diversity. Traffic data may be mapped to other resources for a traffic channel assigned for use. Traffic data that is mapped to the other resources for the signaling channel is punctured. The mapped signaling and traffic data are further processed (e.g., modulated for OFDM or SC-FDMA) and transmitted.

In an embodiment, to receive the signaling at a receiver (e.g., a base station), received symbols are extracted from the resources for the signaling channel. The extracted received symbols are despread with the spreading code to obtain despread symbols. The extracted received symbols may also be despread with one or more spreading codes not used for signaling to obtain interference estimates. The despread symbols are detected (e.g., with the interference estimates, if available) to recover the transmitted signaling. Extracted received symbols from different clusters may be despread and combined to recover a signaling message sent on these clusters. Received symbols may also be extracted from the resources for the assigned traffic channel. Received symbols extracted from the resources for the signaling channel are punctured. The unpunctured received symbols are processed to obtain decoded data.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 7B shows a time-frequency block not punctured by an ACK segment.

FIG. 7C shows a time-frequency block punctured by an ACK segment.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
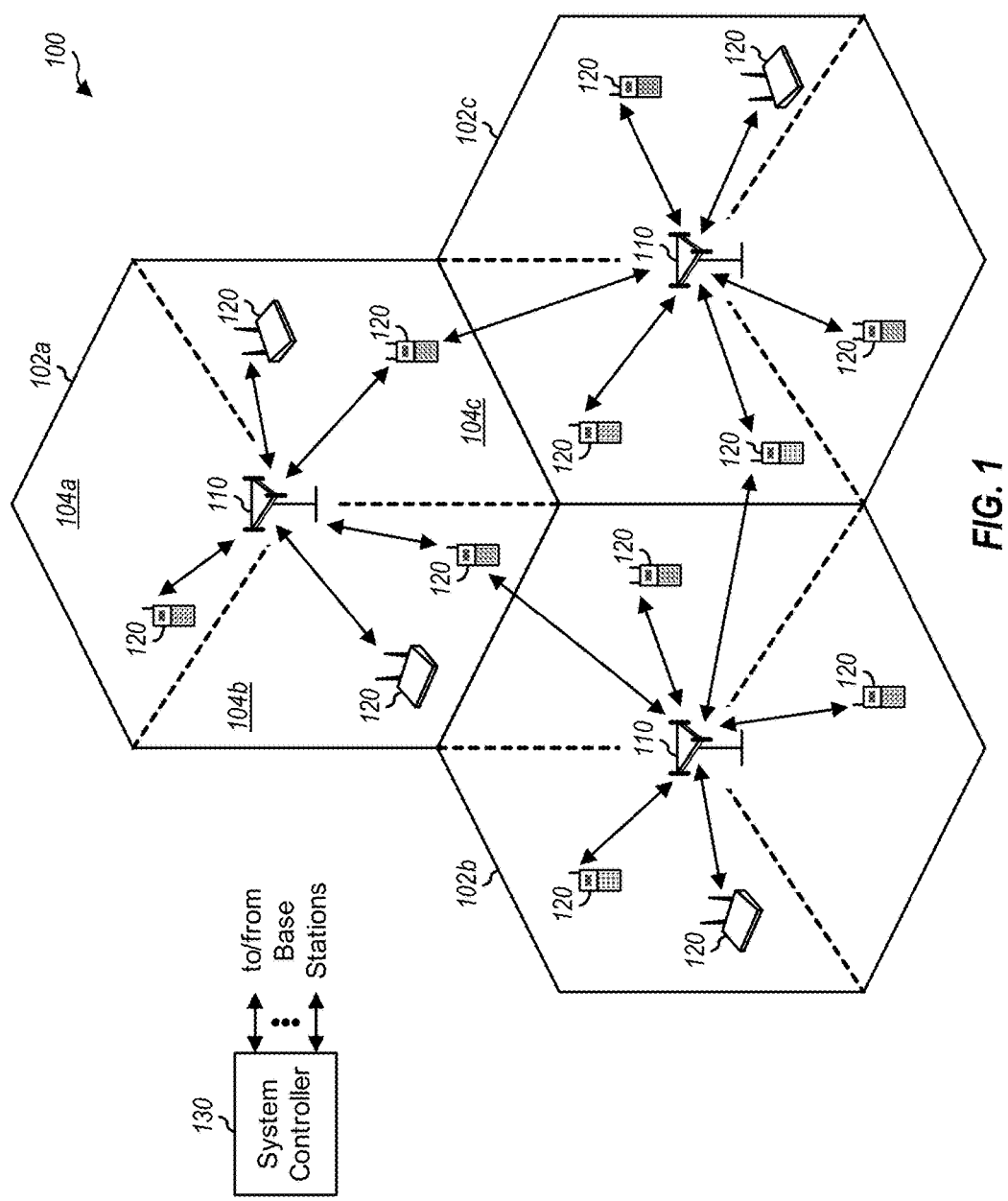
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, an access point, a Node B, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to base stations 110 and provides coordination and control for these base stations. System controller 130 may be a single network entity or a collection of network entities. For a distributed architecture, the base stations may communicate with one another as needed.

The signaling transmission techniques described herein may be used to send various types of signaling such as ACK information, power control commands, channel quality indicators (CQIs), requests for system resources, access probes, feedback information, and so on. These techniques may be used for the forward link as well as the reverse link. For clarity, these techniques are described below for sending ACK information on the reverse link.

System 100 may employ hybrid automatic repeat request (H-ARQ) transmission, which is also called incremental redundancy (IR) transmission. With H-ARQ, a transmitter sends one or more transmissions for a data packet until the packet is decoded correctly by a receiver or the maximum number of transmissions has been sent. H-ARQ improves reliability for data transmission and supports rate adaptation for packets in the presence of changes in channel conditions.

Figure 2:
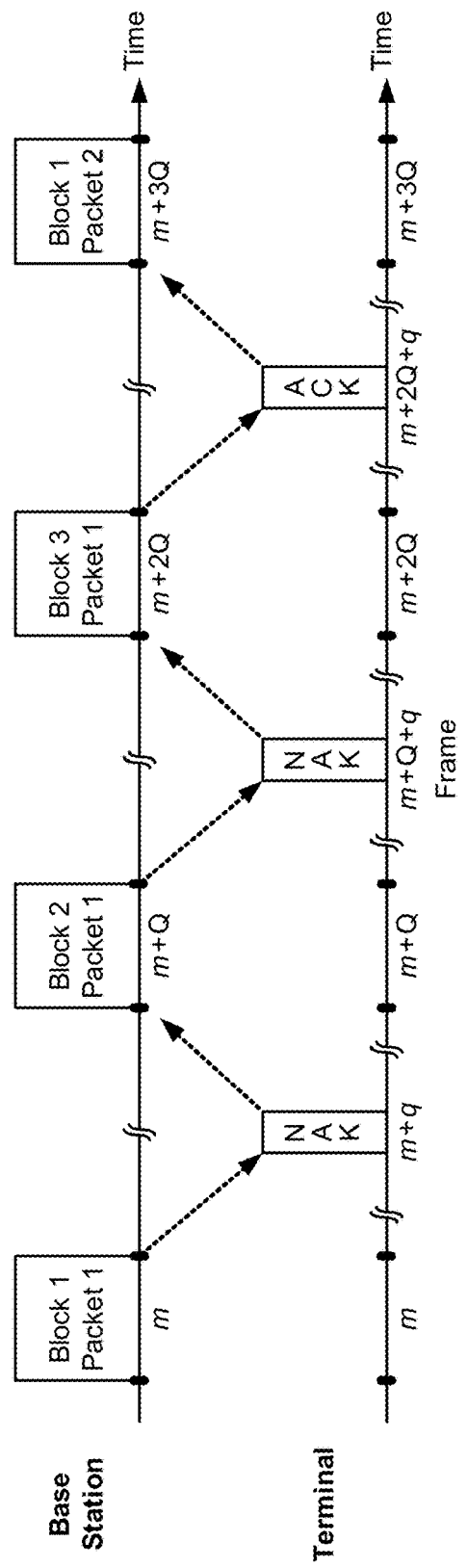
FIG. 2 illustrates H-ARQ transmission on the forward link.

FIG. 2 illustrates H-ARQ transmission on the forward link. A base station processes (e.g., encodes and modulates) a data packet (Packet 1) and generates multiple (V) data blocks, where V>1. A data packet may also be called a codeword and so on. A data block may also be called a subpacket, an H-ARQ transmission, and so on. Each data block for the packet may contain sufficient information to allow a terminal to correctly decode the packet under favorable channel conditions. The V data blocks typically contain different redundancy information for the packet. Each data block may be sent in a frame, which may be of any time duration. The V data blocks are sent one at a time until the packet is terminated, and the block transmissions are spaced apart by Q frames, where Q>1.

The base station transmits the first data block (Block 1) for Packet 1 in frame m. The terminal receives and processes (e.g., demodulates and decodes) Block 1, determines that Packet 1 is decoded in error, and sends a NAK to the base station in frame m+q, where q is the ACK/NAK delay and $1 \leq q < Q$. The base station receives the NAK and transmits the second data block (Block 2) for Packet 1 in frame m+Q. The terminal receives Block 2, processes Blocks 1 and 2, determines that Packet 1 is decoded in error, and sends back a NAK in frame m+Q+q. The block transmission and NAK response may continue up to V times. For the example shown in FIG. 2, the base station transmits data block 3 (Block 3) for Packet 1 in frame m+2Q. The terminal receives Block 3, processes Blocks 1 through 3 for Packet 1, determines that the packet is decoded correctly, and sends back an ACK in frame m+2Q+q. The base station receives the ACK and terminates the transmission of Packet 1. The base station processes the next data packet (Packet 2) and transmits the data blocks for Packet 2 in similar manner.

In FIG. 2, a new data block is sent every Q frames. To improve channel utilization, the base station may transmit up to Q packets in an interlaced manner. In an embodiment, a first interlace is formed with frames m, m+Q, and so on, a second interlace is formed with frames m+1, m+Q+1, and so on, and a Q-th interlace is formed with frames m+Q−1, m+2Q−1, and so on. The Q interlaces are offset from one another by one frame. The base station may transmit up to Q packets on the Q interlaces. For example, if Q=2, then the first interlace may include odd-numbered frames, and the second interlace may include even-numbered frames. As another example, if Q=6, then six interlaces may be formed and used to send six packets in an interlaced manner. In general, the H-ARQ retransmission delay Q and the ACK/NAK delay q are typically selected to provide sufficient processing time for both the transmitter and receiver.

For clarity, FIG. 2 shows transmission of both NAKs and ACKs. For an ACK-based scheme, which is assumed for the description below, an ACK is sent if a packet is decoded correctly, and NAKs are not sent and are presumed by the absence of ACKs.

The signaling transmission techniques described herein may be used for various wireless communication systems such as a CDMA system, a TDMA system, an FDMA system, an orthogonal frequency division multiple access (OFDMA) system, a single-carrier frequency division multiple access (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers are also called tones, bins, and so on. With OFDM, each subcarrier that may be independently modulated with data. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

The signaling transmission techniques may also be used with various subcarrier structures. For simplicity, the following description assumes that the K total subcarriers are usable for transmission and are given indices of 1 through K.

Figure 3A:
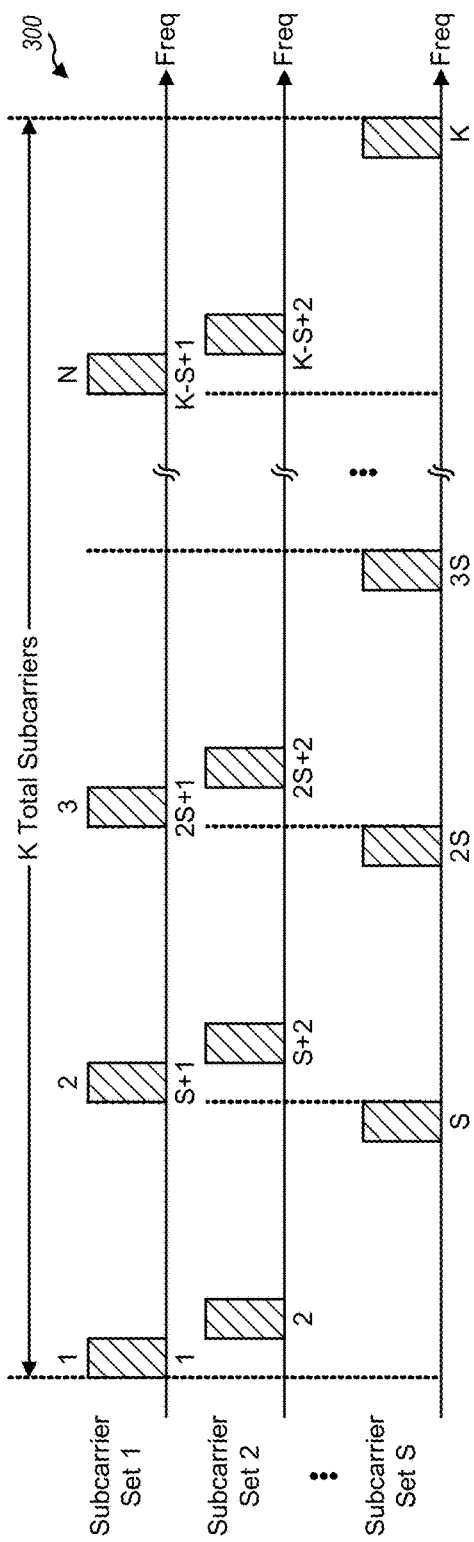
FIGS. 3A and 3B show two subcarrier structures.

FIG. 3A shows a distributed subcarrier structure 300. For subcarrier structure 300, the K total subcarriers are arranged into S non-overlapping sets such that each set contains N subcarriers that are uniformly distributed across the K total subcarriers. Consecutive subcarriers in each set are spaced apart by S subcarriers, where K=S·N. Hence, set s contains subcarriers s, S+s, 2S+s, ..., (N−1)·S+s, for s∈{1, ..., S}.

Figure 3B:
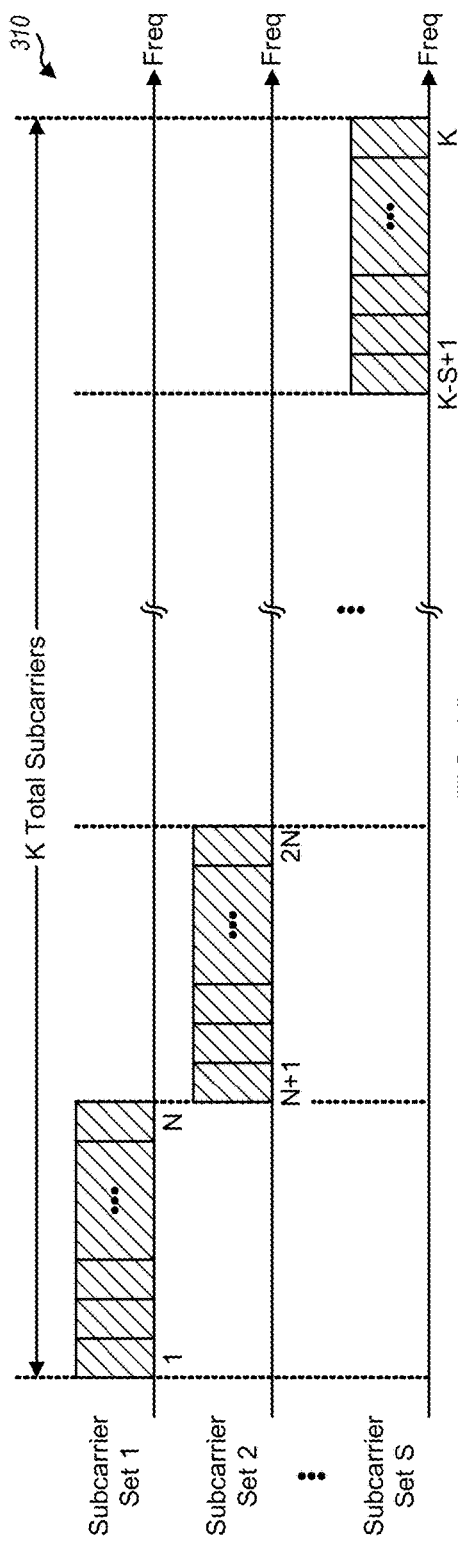

FIG. 3B shows a block subcarrier structure 310. For subcarrier structure 310, the K total subcarriers are arranged into S non-overlapping sets such that each set contains N consecutive subcarriers, where K=S·N. Hence, set s contains subcarriers (s−1)·N+1 through s·N, for s∈{1, ..., S}.

In general, the signaling transmission techniques may be used with any subcarrier structure having any number of subcarrier sets. Each subcarrier set may include any number of subcarriers that may be arranged in any manner. For example, the subcarriers in each set may be uniformly distributed across the system bandwidth as shown in FIG. 3A, contiguous as shown in FIG. 3B, and so on. The subcarrier sets may include the same or different numbers of subcarriers.

Figure 4:
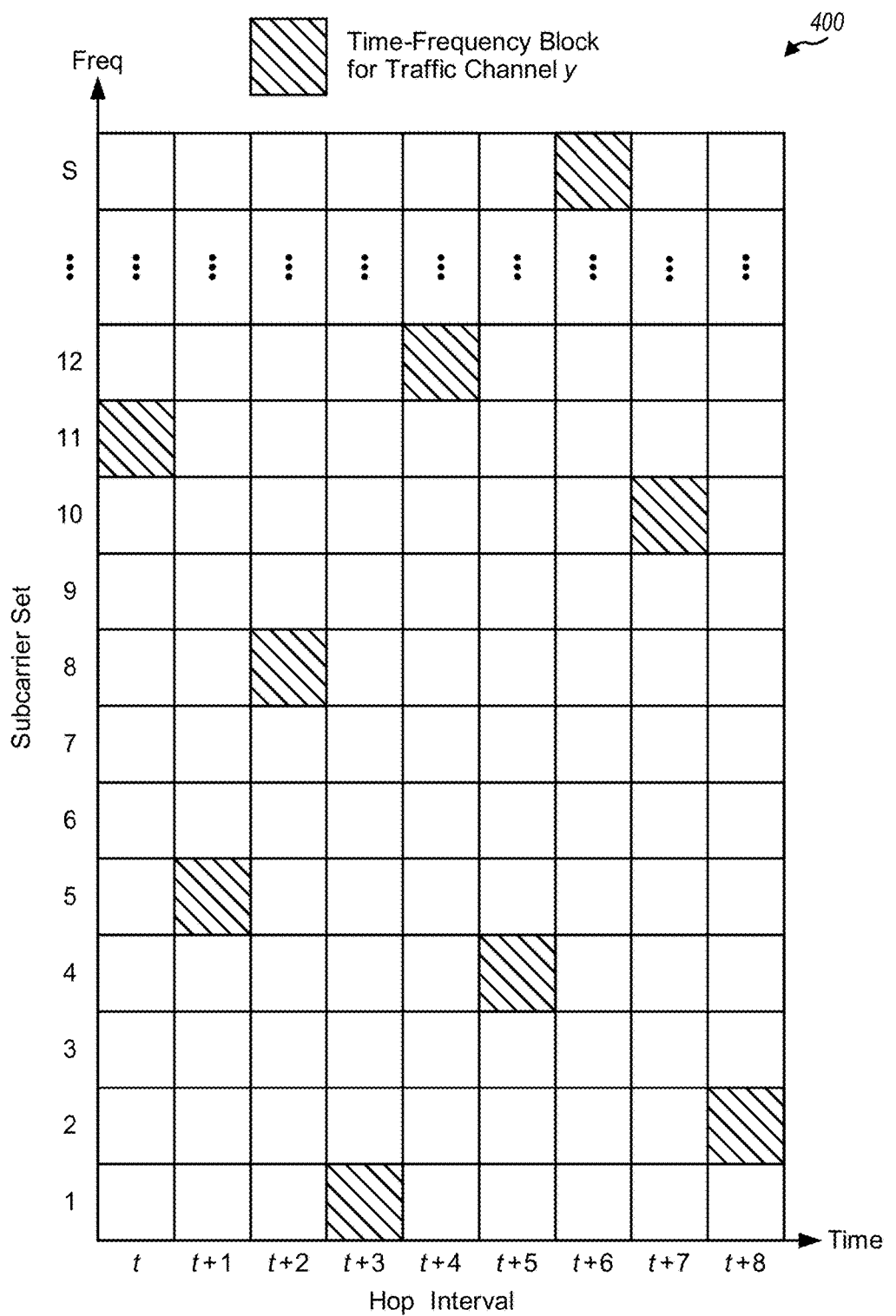
FIG. 4 shows a frequency-hopping scheme.

FIG. 4 shows an exemplary partitioning of time and frequency into time-frequency blocks. A time-frequency block may also be called a tile, a traffic block, or some other terminology. In an embodiment, a time-frequency block corresponds to a specific subcarrier set in a specific time interval, which may span one or multiple symbol periods. A symbol period is the duration of one OFDM symbol or one SC-FDMA symbol. S orthogonal time-frequency blocks are available in each time interval.

System 100 may define traffic channels to facilitate allocation and use of the available system resources. A traffic channel is a means for sending data from a transmitter to a receiver and may also be called a channel, a physical channel, a physical layer channel, a data channel, a transmission channel, and so on. Traffic channels may be defined for various types of system resources such as frequency and time.

In general, any number of traffic channels may be defined, and the traffic channels may have the same or different transmission capacities. For simplicity, much of the following description assumes that S traffic channels are defined, with each traffic channel being mapped to one time-frequency block in each time interval used for data transmission. These S traffic channels may be assigned to up to S terminals.

FIG. 4 also shows an exemplary frequency-hopping scheme 400. For scheme 400, each traffic channel is mapped to a specific sequence of time-frequency blocks that hop across frequency in different time intervals to achieve frequency diversity, as shown in FIG. 4. A hop interval is the amount of time spent on a given subcarrier set and is equal to one time interval for the embodiment shown in FIG. 4. A frequency hopping (FH) pattern indicates the specific time-frequency block to use for each traffic channel in each time interval used for data transmission. FIG. 4 shows the sequence of time-frequency blocks for traffic channel y. The other traffic channels may be mapped to vertically and circularly shifted versions of the time-frequency block sequence for traffic channel y.

Frequency hopping may be used with the subcarrier structures shown in FIGS. 3A and 3B. In an embodiment, which is called symbol rate hopping, a time-frequency block is one distributed subcarrier set (e.g., as shown in FIG. 3A) in one symbol period. For symbol rate hopping, the subcarriers for a traffic channel span across the entire system bandwidth and change from symbol period to symbol period. In another embodiment, which is called block hopping, a time-frequency block is one contiguous subcarrier set (e.g., as shown in FIG. 3B) in multiple symbol periods. For block hopping, the subcarriers for a traffic channel are contiguous and fixed for an entire hop interval but change from hop interval to hop interval. Other frequency hopping schemes may also be defined.

A terminal may send ACK information on a reverse link acknowledgment channel (R-ACKCH) to a base station to acknowledge H-ARQ transmissions sent by the base station on the forward link. The R-ACKCH is also called an ACK channel in the following description. Referring back to FIG. 2, an H-ARQ transmission is sent in one frame, which may span one or multiple hop intervals. The terminal may send an ACK/NAK for each frame in which an H-ARQ transmission is received from the base station. Several embodiments of the ACK channel for different frame sizes are described below.

Figure 5A:
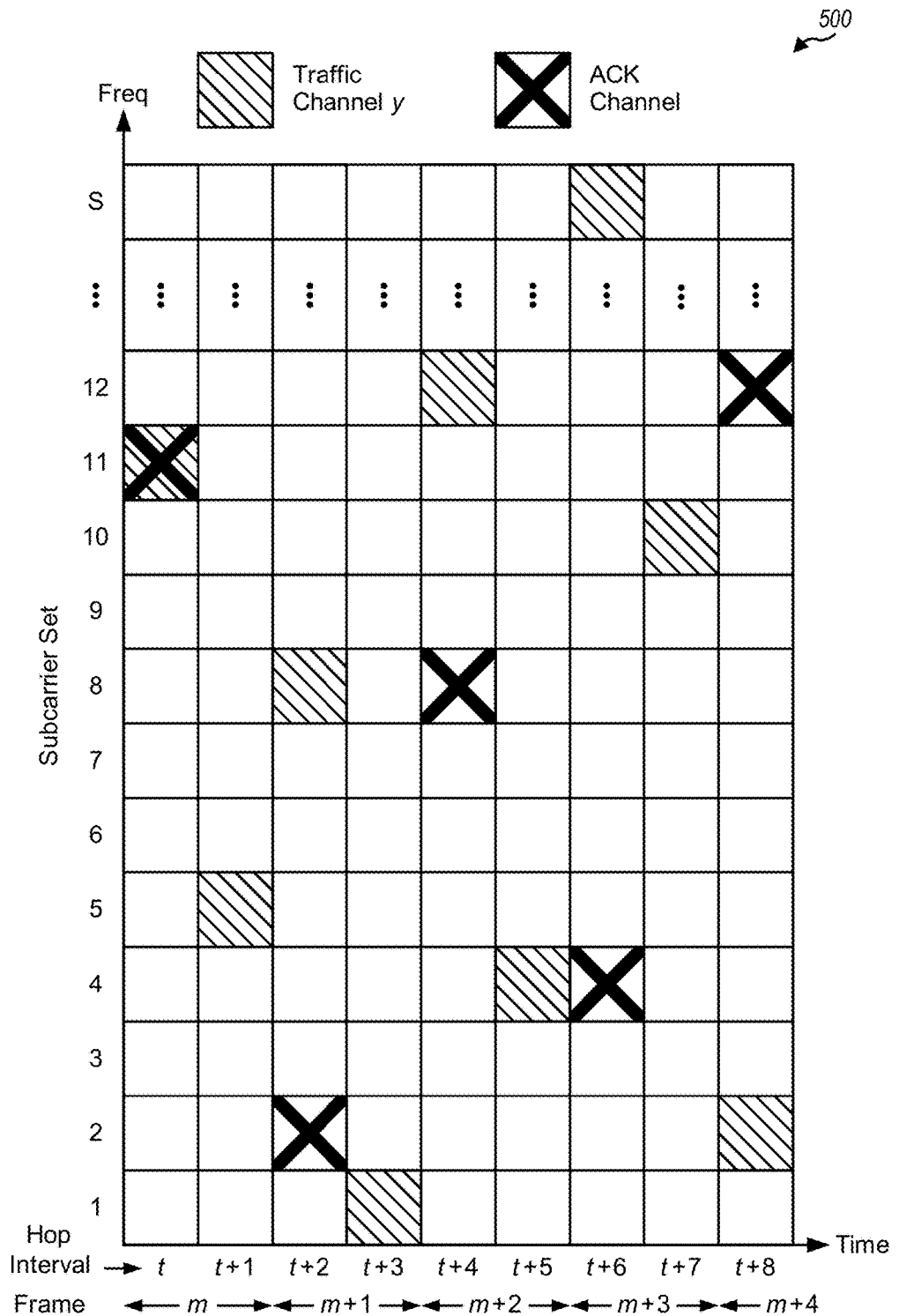
FIGS. 5A and 5B show two signaling transmission schemes for an ACK channel.

FIG. 5A shows a signaling transmission scheme 500 for the ACK channel. For the embodiment shown in FIG. 5A, a frame spans two hop intervals, and the ACK channel is mapped to one time-frequency block in each ACK frame. An ACK frame is a frame in which the ACK channel is sent, and a data frame is a frame used for data transmission. Each data frame may be associated with an ACK frame that is q frames away, as shown in FIG. 2. The ACK channel may puncture all or a portion of each time-frequency block to which the ACK channel is mapped, as described below.

Figure 5B:
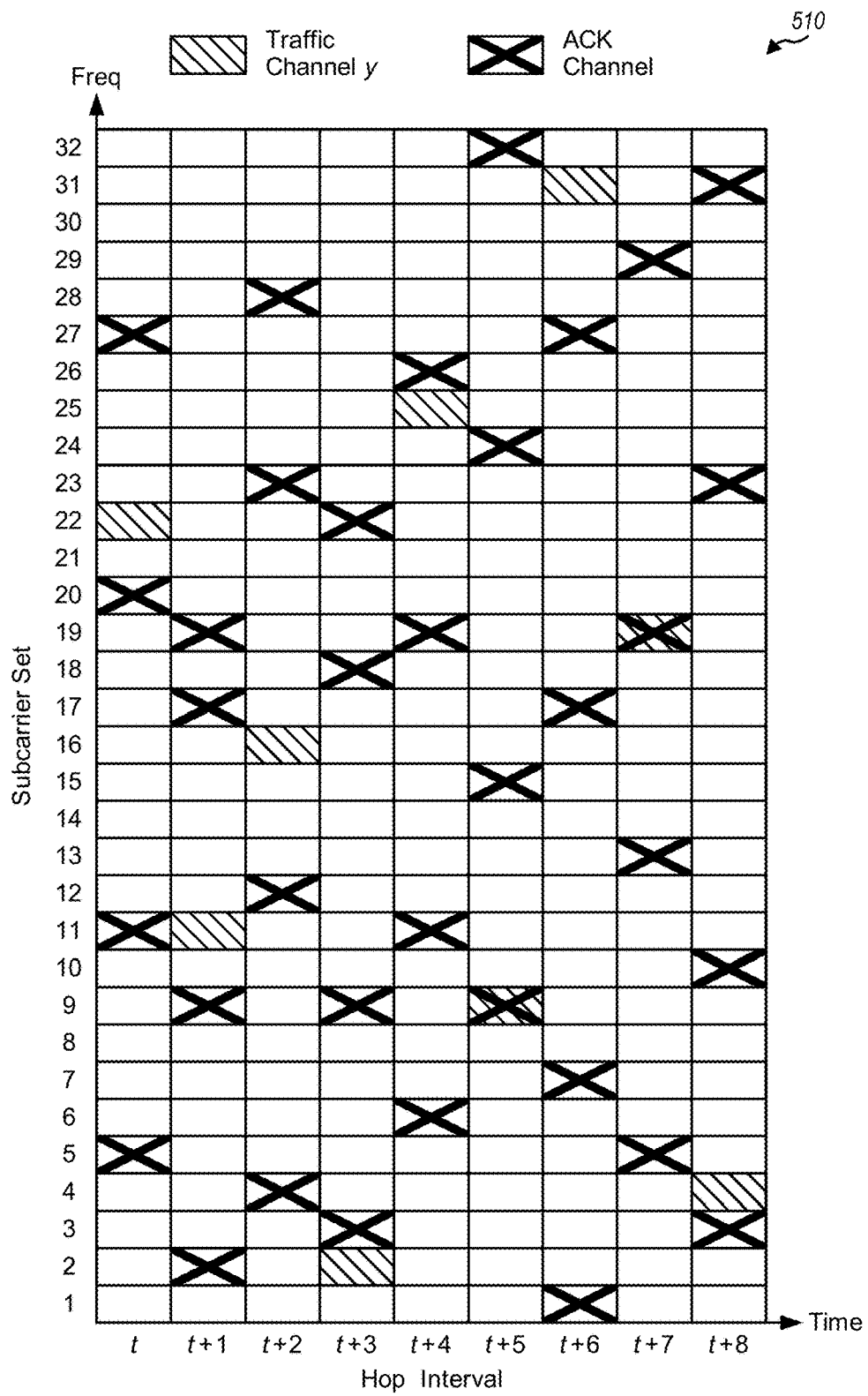

FIG. 5B shows a signaling transmission scheme 510 for the ACK channel. For the embodiment shown in FIG. 5B, S=32, a frame spans one hop interval, and the ACK channel is mapped to four time-frequency blocks in each ACK frame. The ACK channel may puncture all or a portion of each time-frequency block.

For clarity, FIGS. 5A and 5B show the ACK channel puncturing one traffic channel y whenever the ACK channel is mapped to a time-frequency block used for traffic channel y. The ACK channel also punctures other traffic channels, which are not labeled in FIGS. 5A and 5B for clarity. A terminal may transmit data on an assigned traffic channel (e.g., traffic channel y) and may transmit ACK messages on the ACK channel. If many traffic channels are available, then the ACK channel punctures only a portion of the transmission on the assigned traffic channel and punctures mostly the transmissions from other terminals on other traffic channels.

In general, the ACK channel may be mapped to any number of time-frequency blocks in each ACK frame. In an embodiment, the ACK channel is mapped to a fixed number of time-frequency blocks in each ACK frame. This fixed number may be determined based on the number of available traffic channels and/or some other factors. In another embodiment, the ACK channel is mapped to a configurable number of time-frequency blocks in each ACK frame. This configurable number may be determined based on the number of traffic channels that are in use, the number of packets that are sent on each traffic channel, the number of ACK bits that may be sent in each time-frequency block, and so on.

FIGS. 5A and 5B show specific embodiments for puncturing the traffic channels with the ACK channel. In another embodiment, the ACK channel is mapped to one or more fixed subcarrier sets, and the traffic channels hop around the fixed ACK channel. In yet another embodiment, the S subcarrier sets are arranged into G regions, with each region including S/G consecutive subcarrier sets. The ACK channel is then mapped to one subcarrier set in each region. The ACK channel may also puncture the traffic channels in other manners.

In general, the ACK channel may be mapped to time-frequency blocks in a pseudo-random or deterministic manner. The ACK channel may be mapped to different subcarrier sets to achieve frequency and interference diversity, e.g., as shown in FIGS. 5A and 5B. In an embodiment, the ACK channel is pseudo-random with respect to the traffic channels and equally punctures the traffic channels. This may be achieved by hopping the ACK channel, hopping the traffic channels, or hopping both the ACK channel and the traffic channels. An FH pattern may indicate the specific time-frequency block(s) for the ACK channel in each ACK frame. This FH pattern may be sent to the terminals or may be known a priori by the terminals. In any case, the terminals have knowledge of the time-frequency blocks occupied by the ACK channel.

Figure 6:
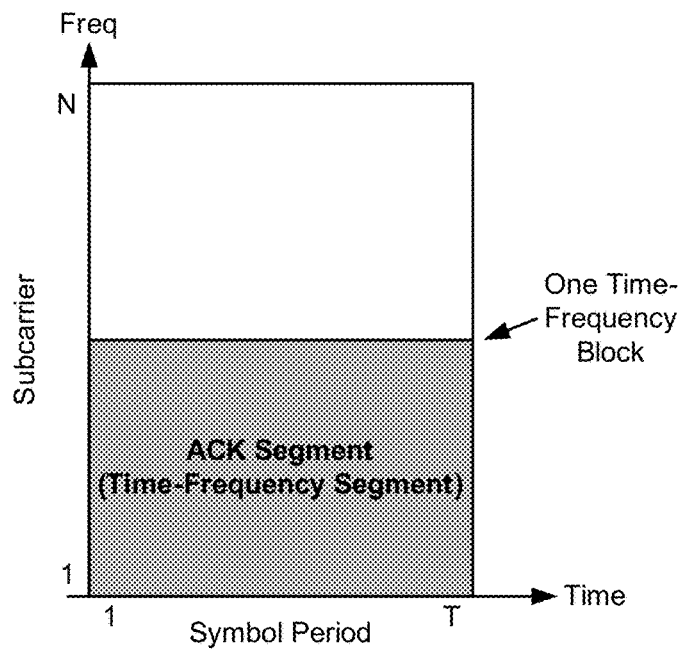
FIG. 6 shows puncturing of a time-frequency block for the ACK channel.

FIG. 6 shows an embodiment of the puncturing of a time-frequency block by the ACK channel. The time-frequency block covers N subcarriers and spans T symbol periods. In general, the ACK channel may puncture all or a portion of the time-frequency block. An ACK segment is a time-frequency segment used for the ACK channel. An ACK segment is formed by the part of the time-frequency block that is punctured and used for the ACK channel. In general, an ACK segment may cover any number of subcarriers and may span any number of symbol periods. In an embodiment, which is not shown in FIG. 6, the ACK channel punctures the entire time-frequency block. For this embodiment, the ACK channel is sent in the entire time-frequency block, and traffic data is not sent in the time-frequency block. In another embodiment, which is shown in FIG. 6, the ACK channel punctures a portion of the time-frequency block. For example, the ACK channel may puncture a half, a quarter, an eighth, or some other fraction of the time-frequency block. The punctured portion may be contiguous in both time and frequency, as shown in FIG. 6. Transmission on contiguous subcarriers may result in a lower peak-to-average power ratio (PAPR), which is desirable. Alternatively, the punctured portion may be spread across frequency, across time, or across both frequency and time. In any case, the ACK channel is sent in the punctured portion of the time-frequency block, and traffic data may be sent in the remaining portion of the time-frequency block.

Figure 7A:
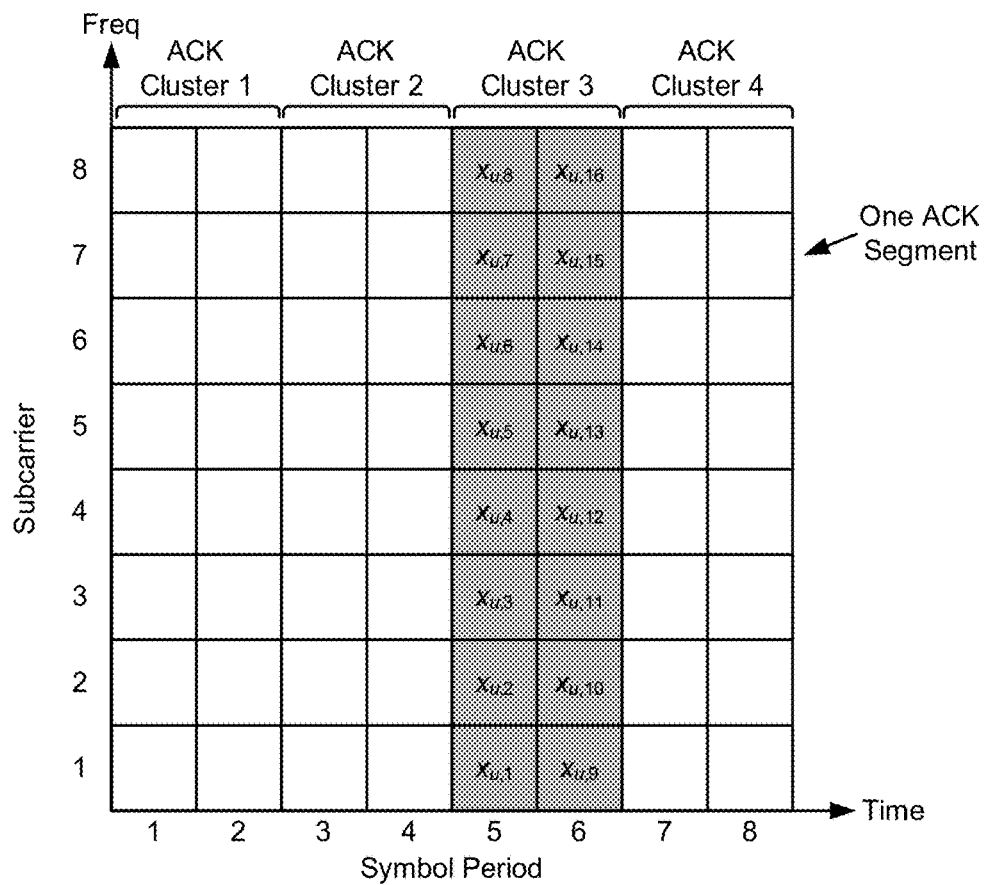
FIG. 7A shows an ACK segment with multiple clusters.

FIG. 7A shows an embodiment of an ACK segment. For this embodiment, the ACK segment covers 8 subcarriers and spans 8 symbol periods. The ACK segment includes 64 transmission units. A transmission unit is one subcarrier in one symbol period. For the embodiment shown in FIG. 7A, the ACK segment is partitioned into four clusters. Each cluster covers 8 subcarriers, spans 2 consecutive symbol periods, and includes 16 transmission units.

In general, an ACK segment may be partitioned in various manners. In another embodiment, each cluster covers two subcarriers and spans all 8 symbol periods. In yet another embodiment, each cluster covers all subcarriers and spans all symbol periods in the ACK segment. For example, cluster 1 may include subcarriers 1 and 2 in symbol periods 1 and 5, subcarriers 3 and 4 in symbol periods 2 and 6, subcarriers 5 and 6 in symbol periods 3 and 7, and subcarriers 7 and 8 in symbol periods 4 and 8.

FIG. 7B shows an embodiment of a time-frequency block that is not punctured by an ACK segment. For this embodiment, the time-frequency block covers 16 subcarriers, spans 8 symbol periods, and includes 128 transmission units. Pilot symbols may be sent on some of the transmission units, and data symbols may be sent on the remaining transmission units. As used herein, a data symbol is a symbol for traffic data, a pilot symbol is a symbol for pilot, which is data that is known a priori by both the base station and the terminals, a signaling symbol is a symbol for signaling, and a symbol is typically a complex value. For the embodiment shown in FIG. 7B, pilot symbols are sent on subcarriers 1, 9 and 16 in symbol periods 1, 2, 3, 6, 7 and 8, or six strips of three pilot symbols. The pilot symbols may be distributed across frequency, e.g., as shown in FIG. 7B, and may be used to derive a channel estimate for the time-frequency block. The channel estimate may be used to perform data detection for the data symbols sent in the time-frequency block.

FIG. 7C shows an embodiment of a time-frequency block that is punctured by an ACK segment. For this embodiment, pilot symbols are sent on subcarriers 9 and 16 in symbol periods 1, 2, 3, 6, 7 and 8, or four strips of three pilot symbols. The pilot symbols may be used to derive a channel estimate for the unpunctured portion of the time-frequency block.

The embodiment shown in FIGS. 7B and 7C allows a serving sector to derive an interference estimate for an ACK segment for one or more neighbor sectors. A terminal may transmit on an entire time-frequency block to the serving sector if this time-frequency block is not punctured by an ACK segment for the serving sector. However, this time-frequency block may collide with an ACK segment for one or more neighbor sectors. In this case, the lower half of the time-frequency block may observe higher interference from the ACK segment for the neighbor sector(s). The serving sector may estimate the interference from the other sector(s)

based on the pilot symbols sent on subcarrier 1 in symbol periods 1, 2, 3, 6, 7 and 8. The serving sector may use the interference estimate for data detection of the data symbols sent in the time-frequency block.

FIGS. 7B and 7C show one embodiment for sending pilot and data in a time-frequency block. Pilot and data may also be sent using various other patterns for a time-frequency block. In general, a sufficient number of pilot symbols may be sent on a time-frequency block to allow a serving sector to derive a channel estimate for the time-frequency block, with and without puncturing by an ACK segment for the serving sector. A sufficient number of pilot symbols may be located such that the serving sector can derive an interference estimate for the ACK segment from neighbor sectors.

A terminal may send an ACK message for each H-ARQ transmission received from a base station. The amount of information sent in each ACK message may be dependent on the number of packets sent in the corresponding H-ARQ transmission. In an embodiment, an ACK message includes one bit that acknowledges an H-ARQ transmission for one packet. In another embodiment, an ACK message includes multiple (B) bits that acknowledge an H-ARQ transmission for B packets. In an embodiment, an ACK message is sent with On/Off keying, for example, '1' for ACK and '0' for NAK. In another embodiment, an ACK message is encoded prior to transmission.

Multiple terminals may send their ACK messages using code division multiplexing (CDM), time division multiplexing (TDM), frequency division multiplexing (FDM), some other orthogonal multiplexing scheme, or a combination thereof. Multiple terminals may send their ACK messages in the same cluster of an ACK segment using any orthogonal multiplexing scheme.

In an embodiment, ACK messages are sent using CDM. For this embodiment, the terminals are assigned different spreading codes or sequences, and each terminal spread its ACK messages with its spreading code. The spread ACK messages for the terminals are orthogonal to one another in the code domain.

In an embodiment, the spreading codes are orthogonal codes formed with columns of a Hadamard matrix. A 2×2 Hadamard matrix $\underline{W}_{2\times 2}$ and a larger size Hadamard matrix $\underline{W}_{2L\times 2L}$ may be expressed as:

$$\underline{W}_{2\times 2} = \begin{bmatrix} 1 & 1 \\ 1 & -1 \end{bmatrix} \text{ and } \underline{W}_{2L\times 2L} = \begin{bmatrix} \underline{W}_{L\times L} & \underline{W}_{L\times L} \\ \underline{W}_{L\times L} & -\underline{W}_{L\times L} \end{bmatrix}. \quad \text{Eq (1)}$$

Hadamard matrices of square dimensions that are power of two (e.g., 2×2, 4×4, 8×8, and so on) may be formed as shown in equation (1).

In another embodiment, the spreading codes are orthogonal codes formed with columns of a Fourier matrix. An L×L Fourier matrix $\underline{F}_{L\times L}$ has element $f_{n,m}$ in the n-th row of the m-th column, which may be expressed as:

$$f_{n,m} = e^{-j2\pi \frac{(n-1)(m-1)}{L}}, \text{ for } n = 1, \ldots, L \text{ and } m = 1, \ldots, L. \quad \text{Eq (2)}$$

Fourier matrices of any square dimension (e.g., 2×2, 3×3, 4×4, 5×5, and so on) may be formed as shown in equation (2).

A 1-bit ACK message may be spread with an L-chip spreading code to generate a spread ACK message that contains L chips, as follows:

$$x_{u,i} = a_u \cdot w_{u,i}, \text{ for } i=1, \ldots, L, \quad \text{Eq (3)}$$

where $a_u$ is an ACK bit for terminal u, which may have a value of 0 or 1, or $a_u \in \{0, 1\}$;

$w_{u,i}$ is the i-th chip of the spreading code assigned to terminal u; and $x_{u,i}$ is the i-th chip of the spread ACK message for terminal u.

The L chips of the spread ACK message may be sent in the frequency domain by mapping these L ACK chips to L transmission units in an ACK segment, e.g., like OFDMA. Alternatively, these L ACK chips may be sent in the time domain by performing an L-point DFT/FFT to obtain L frequency-domain symbols and mapping these L symbols to L transmission units in an ACK segment, e.g., like SC-FDMA.

For the embodiment shown in FIG. 7A, a 1-bit ACK message may be sent in 16 transmission units, and the ACK bit may be spread with a 16-chip spreading code to generate 16 ACK chips. These 16 ACK chips may then be mapped to 16 transmission units in one ACK cluster. Up to 15 other terminals may send their ACK messages in the same cluster using other spreading codes. Up to 64 terminals may send ACK messages in one ACK segment.

In an embodiment, a subset of the available spreading codes is used for sending ACK information. The remaining spreading codes are not used for sending ACK information and are used instead for interference estimation. In an embodiment, each cluster includes 16 transmission units (e.g., as shown in FIG. 7A), eight spreading codes may be used to send ACK information and are called usable spreading codes, and the remaining eight spreading codes are used for interference estimation and are called reserved spreading codes. For this embodiment, eight usable spreading codes are available for each cluster, and up to 32 ACK messages may be sent in one ACK segment. For this embodiment, eight reserved spreading codes may be used for interference estimation in each cluster. More than 32 ACK messages may be sent in one ACK segment by allocating more spreading codes for sending ACK messages. More than 32 ACK messages may be sent in one ACK frame by allocating more ACK segments for the ACK channel.

In another embodiment, ACK messages are sent using TDM or FDM. For this embodiment, the terminals are assigned different transmission units for the ACK channel, and each terminal sends its ACK message in its assigned transmission units. The ACK messages for the terminals would then be orthogonal to one another in time and/or frequency. In an embodiment based on the ACK segment shown in FIG. 7A, eight terminals may be assigned eight rows of a cluster, and each terminal may send its ACK bit on the two transmission units in the assigned row. In another embodiment, four clusters are formed, with each cluster covering two subcarriers and spanning 8 symbol periods. Eight terminals may be assigned eight columns of a cluster, and each terminal may send its ACK bit on the two transmission units in the assigned column.

Figure 8:
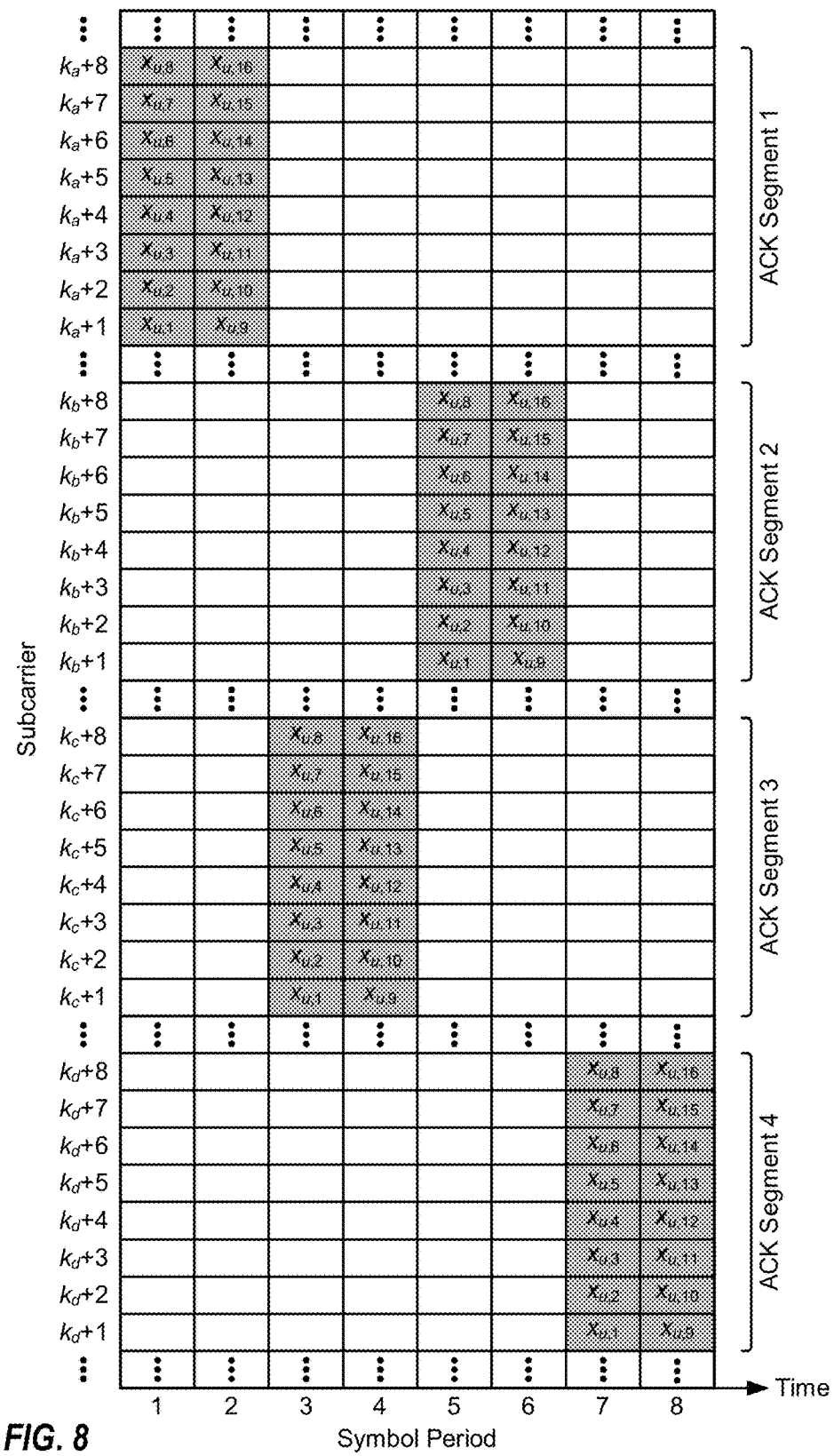
FIG. 8 shows transmission of an ACK message to achieve diversity.

FIG. 8 shows an embodiment for transmitting an ACK message to achieve frequency and time diversity. For this embodiment, the ACK message is sent on different clusters in multiple (C) ACK segments, one cluster in each ACK segment. For the embodiment shown in FIG. 8, C=4, and the ACK message is sent on four different clusters in four ACK segments to achieve time diversity. Sending the ACK message over a longer time interval may also improve link budget for terminals located at the edge of coverage. These disadvantage terminals typically have an upper limit on transmit power. A longer transmission time interval for the ACK message allows a disadvantage terminal to transmit the ACK message with more energy spread over a longer period of time, which improves the likelihood of correctly receiving the ACK message. The ACK message also achieves frequency diversity since the four ACK segments occupy different subcarrier sets in different 2-symbol intervals. C-th order diversity may be achieved for the ACK message by sending the ACK message in different clusters in C ACK segments.

In an embodiment, an ACK message is sent on different clusters in C ACK segments, and the terminals are mapped to the clusters in a pseudo-random or deterministic manner such that an ACK message for each terminal observes interference from a different set of terminals in each of the C clusters on which that ACK message is sent. This embodiment provides time and frequency diversity for the ACK message sent by each terminal. This embodiment further provides diversity with respect to the interference from the other terminals.

A base station performs the complementary despreading to recover the ACK messages sent by the terminals. For each terminal u, the base station despreads the received symbols from each of the C clusters used by terminal u with the spreading code assigned to terminal u and obtains C despread symbols for the C clusters. For each of the C clusters, the base station may also despread the received symbols with each of the reserved spreading codes to obtain an interference estimate for that cluster. The base station may then scale and combine the C despread symbols for terminal u with the interference estimates for the C clusters to obtain a detected ACK message for terminal u, as described below.

The signaling transmission techniques described herein may be used with various channel structures. An exemplary channel structure is described below.

Figure 9:
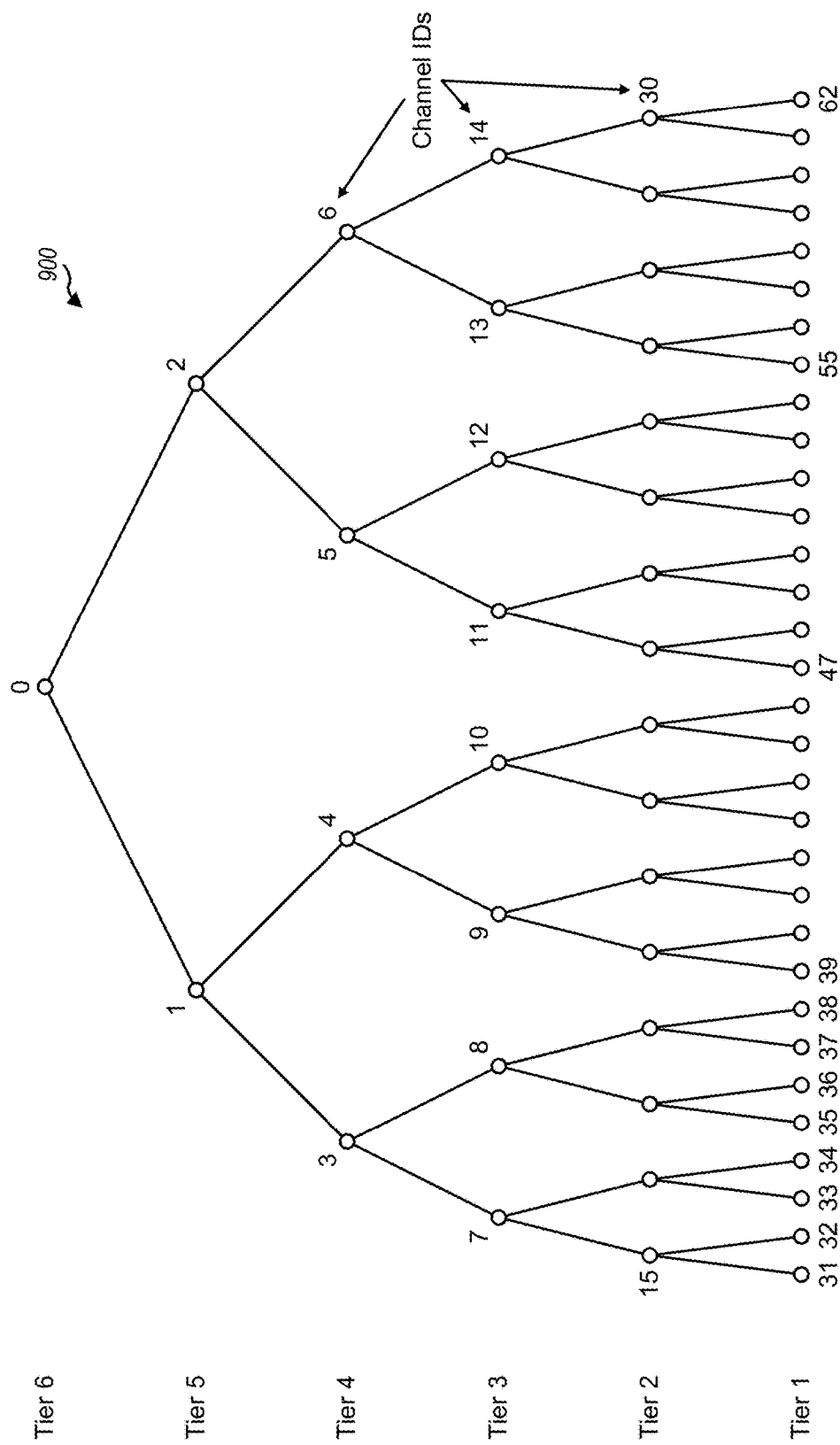
FIG. 9 shows a binary channel tree.

FIG. 9 shows an embodiment of a binary channel tree 900. For the embodiment shown in FIG. 9, S=32 subcarrier sets are available for use. A set of traffic channels may be defined with the 32 subcarrier sets. Each traffic channel is assigned a unique channel ID and is mapped to one or more subcarrier sets in each time interval. For example, a traffic channel may be defined for each node in channel tree 900. The traffic channels may be sequentially numbered from top to bottom and from left to right for each tier. The largest traffic channel corresponding to the topmost node is assigned a channel ID of 0 and is mapped to all 32 subcarrier sets. The 32 traffic channels in the lowest tier 1 have channel IDs of 31 through 62 and are called base traffic channels. Each base traffic channel is mapped to one subcarrier set.

The tree structure shown in FIG. 9 places certain restrictions on the use of the traffic channels for an orthogonal system. For each traffic channel that is assigned, all traffic channels that are subsets (or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time.

In an embodiment, an ACK resource is assigned to each traffic channel that is assigned for use. An ACK resource may also be called an ACK sub-channel or some other terminology. An ACK resource includes pertinent resources (e.g., a spreading code and a set of clusters) used to send an ACK message in each ACK frame. For this embodiment, the ACK messages for each traffic channel may be sent on the assigned ACK resource. The assigned ACK resources may be signaled to the terminal.

In another embodiment, an ACK resource is associated with each of the base traffic channels in the lowest tier of a channel tree. This embodiment allows for assignment of the maximum number of traffic channels of the minimum size. A larger traffic channel corresponding to a node above the lowest tier may use (1) the ACK resources for all base traffic channels under the larger traffic channel, (2) the ACK resource for one of the base traffic channels, e.g., the base traffic channel with the lowest channel ID, or (3) the ACK resources for a subset of the base traffic channels under the larger traffic channel. For options (1) and (3) above, an ACK message for the larger traffic channel may be sent using multiple ACK resources to improve the likelihood of correct reception. If multiple packets are sent in parallel, e.g., using multiple-input multiple-output (MIMO) transmission, then a larger traffic channel with multiple base traffic channels may be assigned for the transmission. The number of base traffic channels is equal to or greater than the number of packets. Each packet may be mapped to a different base traffic channel. The ACK for each packet may then be sent using the ACK resource for the associated base traffic channel.

In yet another embodiment, an ACK resource is assigned to each packet to be acknowledged. A terminal may be assigned one ACK resource if one packet is sent in a frame. A terminal may be assigned multiple ACK resources if multiple packets are sent in a frame, e.g., using either a larger traffic channel or spatial multiplexing to transmit via multiple antennas.

In yet another embodiment, an H-ARQ transmission may span multiple interlaces, and an ACK message is sent in multiple ACK frames. The base station may combine the detected ACK messages for the multiple ACK frames to improve ACK detection performance.

System 100 may support a single-carrier mode and a multi-carrier mode. In the single-carrier mode, K subcarriers may be available for transmission, and the ACK channel may puncture the traffic channels as described above. In the multi-carrier mode, K subcarriers may be available for each of multiple carriers. The ACK channel may be scaled up for the multi-carrier mode to support more traffic channels and/or to acknowledge more packets that may be sent with more carriers.

The transmit power for the ACK channel may be controlled to achieve good performance, which may be quantified by a given target ACK-to-NAK error rate (e.g., 1%), a given target NAK-to-ACK error rate (e.g., 0.1%), and/or some other metrics. In an embodiment, the transmit power for the ACK channel for a given terminal is adjusted based on the measured performance for the ACK channel for that terminal. In another embodiment, the transmit power for the ACK channel is adjusted based on the transmit power for a reference channel. The reference channel may be any channel that is sent often or regularly, e.g., a traffic channel or a signaling channel such as a channel quality indicator (CQI) channel. The ACK channel may use the transmit power for the reference channel as a power reference. The transmit power for the ACK channel may be set equal to the power reference plus a delta, which may be adjusted based on the performance of the ACK channel. The reference channel is thus used for short-term power set point while the long-term offset of the ACK channel is controlled based on the ACK performance.

Figures 10, 11:
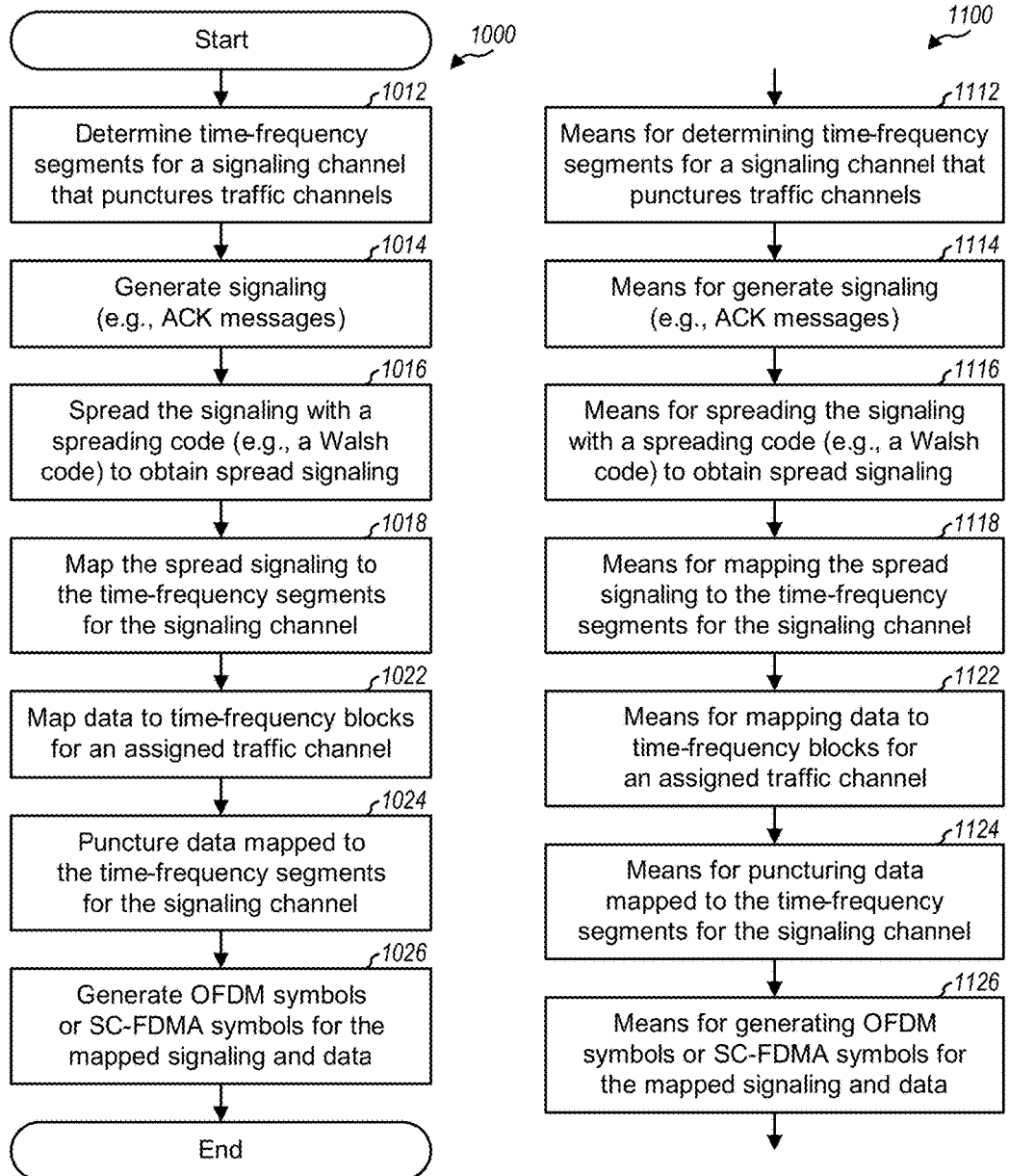
FIG. 10 shows a process for sending signaling and traffic data.
FIG. 11 shows an apparatus for sending signaling and traffic data.

FIG. 10 shows an embodiment of a process 1000 for sending signaling and traffic data. The signaling may be ACK messages or some other type of signaling. Process 1000 may be performed by a terminal to transmit on the reverse link.

For the embodiment shown in FIG. 10, signaling is sent with CDM. The time-frequency segments for a signaling channel that punctures traffic channels are determined, e.g., based on a frequency hopping pattern for the signaling channel (block 1012). Signaling is generated (block 1014) and spread with a spreading code (e.g., a Walsh code) to obtain spread signaling (block 1016). The spread signaling is mapped to the time-frequency segments for the signaling channel (block 1018). Each time-frequency segment may include multiple clusters. A signaling message may be mapped to different clusters in multiple time-frequency segments to achieve diversity. The signaling may also be sent with other multiplexing schemes instead of CDM.

Traffic data is processed and mapped to time-frequency blocks for a traffic channel assigned for use (block 1022). Traffic data that is mapped to the time-frequency segments for the signaling channel is punctured (block 1024). OFDM symbols or SC-FDMA symbols are generated for the mapped signaling and traffic data (block 1026).

FIG. 11 shows an embodiment of an apparatus 1100 for sending signaling and traffic data. Apparatus 1100 includes means for determining time-frequency segments for a signaling channel that punctures traffic channels (block 1112), means for generating signaling (block 1114), means for spreading the signaling with a spreading code (e.g., a Walsh code) to generate spread signaling (block 1116), and means for mapping the spread signaling to the time-frequency segments for the signaling channel (block 1118). A signaling message may be mapped to different clusters in multiple time-frequency segments to achieve diversity. Apparatus 1110 further includes means for processing and mapping traffic data to time-frequency blocks for an assigned traffic channel (block 1122), means for puncturing traffic data that is mapped to the time-frequency segments for the signaling channel (block 1124), and means for generating OFDM symbols or SC-FDMA symbols for the mapped signaling and traffic data (block 1126).

Figure 12:
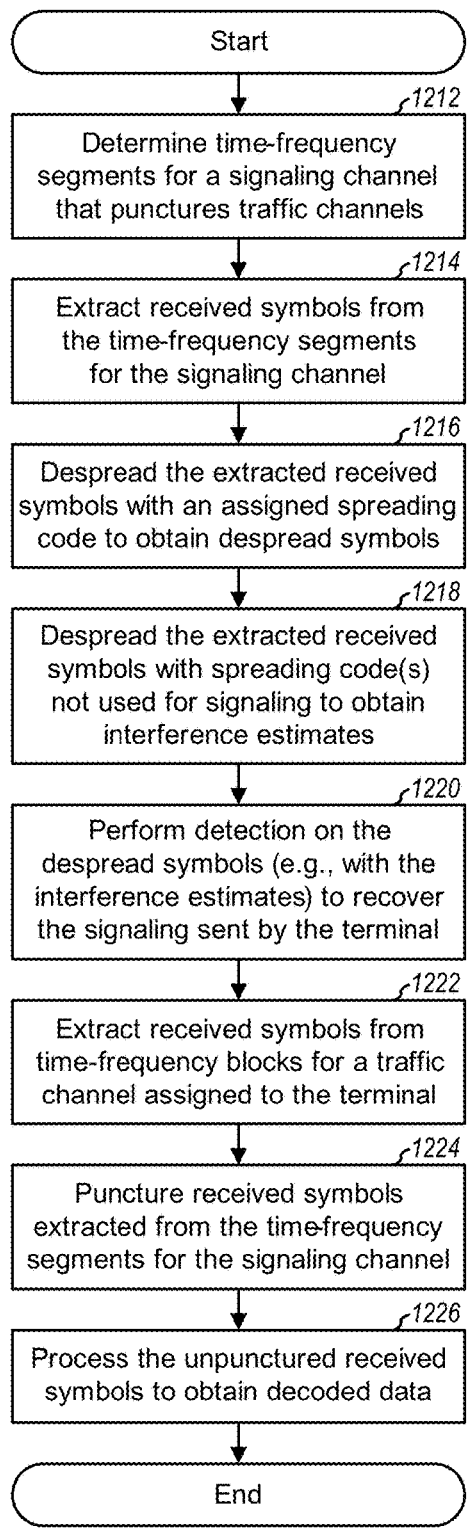
FIG. 12 shows a process for receiving signaling and traffic data.

FIG. 12 shows an embodiment of a process 1200 for receiving signaling and traffic data. Process 1200 may be performed by a base station to receive signaling and data sent on the reverse link. The time-frequency segments for the signaling channel are determined (block 1212). Received symbols are extracted from the time-frequency segments for the signaling channel (block 1214). The extracted received symbols are processed to recover the transmitted signaling. For the embodiment shown in FIG. 12, the extracted received symbols are despread with a spreading code assigned to a terminal to obtain despread symbols for the terminal (block 1216). The extracted received symbols may also be despread with spreading code(s) not used for signaling to obtain interference estimates (block 1218). The despread symbols are detected (e.g., with the interference estimates, if available) to recover the signaling sent by the terminal (block 1220). A signaling message may be sent on different clusters in multiple time-frequency segments. In this case, received symbols are extracted from each cluster and despread with the spreading code, and the despread symbols for the different clusters are detected to recover the signaling message.

Received symbols are extracted from time-frequency blocks for a traffic channel assigned to the terminal (block 1222). Received symbols extracted from the time-frequency segments for the signaling channel are punctured (block 1224). The unpunctured received symbols are processed to obtain decoded data for the terminal (block 1226).

Figure 13:
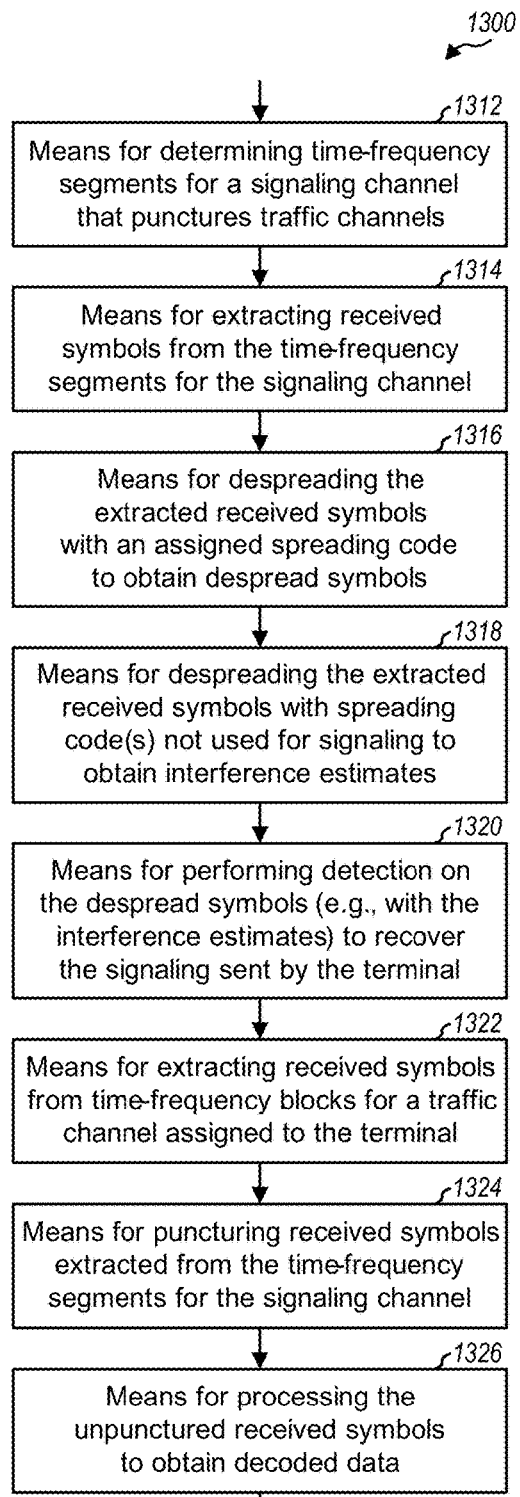
FIG. 13 shows an apparatus for receiving signaling and traffic data.

FIG. 13 shows an embodiment of an apparatus 1300 for receiving signaling and traffic data. Apparatus 1300 includes means for determining the time-frequency segments for the signaling channel (block 1312), means for extracting received symbols from the time-frequency segments for the signaling channel (block 1314), means for despreading the extracted received symbols with a spreading code assigned to a terminal to obtain despread symbols (block 1316), means for despreading the extracted received symbols with spreading code(s) not used for signaling to obtain interference estimates (block 1318), and means for performing detection on the despread symbols (e.g., with the interference estimates, if available) to recover the signaling sent by the terminal (block 1320). A signaling message may also be recovered from different clusters in multiple time-frequency segments. Apparatus 1300 further includes means for extracting received symbols from time-frequency blocks for a traffic channel assigned to the terminal (block 1322), means for puncturing received symbols extracted from the time-frequency segments for the signaling channel (block 1324), and means for processing the unpunctured received symbols to obtain decoded data for the terminal (block 1326).

Figure 14:
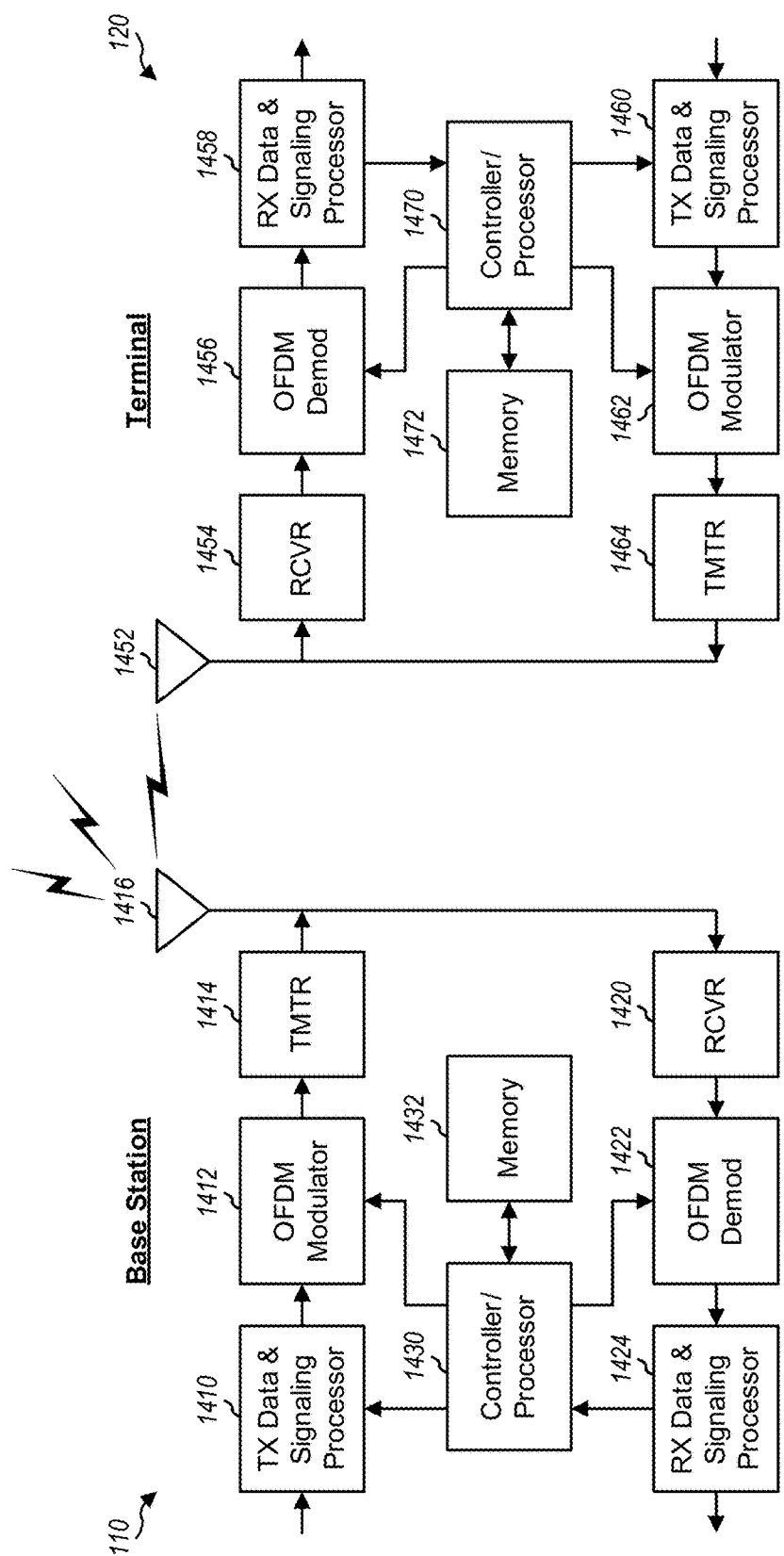
FIG. 14 shows a block diagram of a base station and a terminal.

FIG. 14 shows a block diagram of an embodiment of a base station 110 and a terminal 120 in FIG. 1. For this embodiment, base station 110 and terminal 120 are each equipped with a single antenna.

At base station 110, a transmit (TX) data and signaling processor 1410 receives traffic data for one or more terminals, processes (e.g., formats, encodes, interleaves, and symbol maps) the traffic data for each terminal based on one or more coding and modulation schemes selected for that terminal, and provides data symbols. Processor 1410 also generates pilot symbols and signaling symbols. An OFDM modulator 1412 performs OFDM modulation on the data symbols, pilot symbols, and signaling symbols and provides OFDM symbols. If system 100 utilizes SC-FDMA, then modulator 1412 performs SC-FDMA modulation and provides SC-FDMA symbols. A transmitter (TMTR) 1414 conditions (e.g., converts to analog, filters, amplifies, and upconverts) the OFDM symbols to generate an FL modulated signal, which is transmitted from an antenna 1416.

At terminal 120, an antenna 1452 receives FL modulated signals from base station 110 and possibly other base stations and provides a received signal to a receiver (RCVR) 1454. Receiver 1454 processes (e.g., conditions and digitizes) the received signal and provides received samples. An OFDM demodulator (Demod) 1456 performs OFDM demodulation on the received samples and provides received symbols for the K total subcarriers. A receive (RX) data and signaling processor 1458 processes (e.g., symbol demaps, deinterleaves, and decodes) the received symbols and provides decoded data and signaling for terminal 120.

A controller/processor 1470 receives decoding results from processor 1458 and generates ACK messages for terminal 120. A TX data and signaling processor 1460 generates signaling symbols for the ACK messages, data symbols for traffic data to be sent to base station 110, and pilot symbols. An OFDM modulator 1462 performs OFDM modulation on the data symbols, pilot symbols, and signaling symbols and provides OFDM symbols. A transmitter 1464 conditions the OFDM symbols and generates an RL modulated signal, which is transmitted from antenna 1452.

At base station 110, RL modulated signals from terminal 120 and other terminals are received by antenna 1416, conditioned and digitized by a receiver 1420, demodulated by an OFDM demodulator 1422, and processed by an RX data and signaling processor 1424 to recover the ACK messages and traffic data sent by terminal 120 and other terminals. A controller/processor 1430 receives the detected ACK messages and controls the data transmissions on the forward link to the terminals.

Controllers/processors 1430 and 1470 direct the operation of various processing units at base station 110 and terminal 120, respectively. Memories 1432 and 1472 store program codes and data for base station 110 and terminal 120, respectively.

Figure 15:
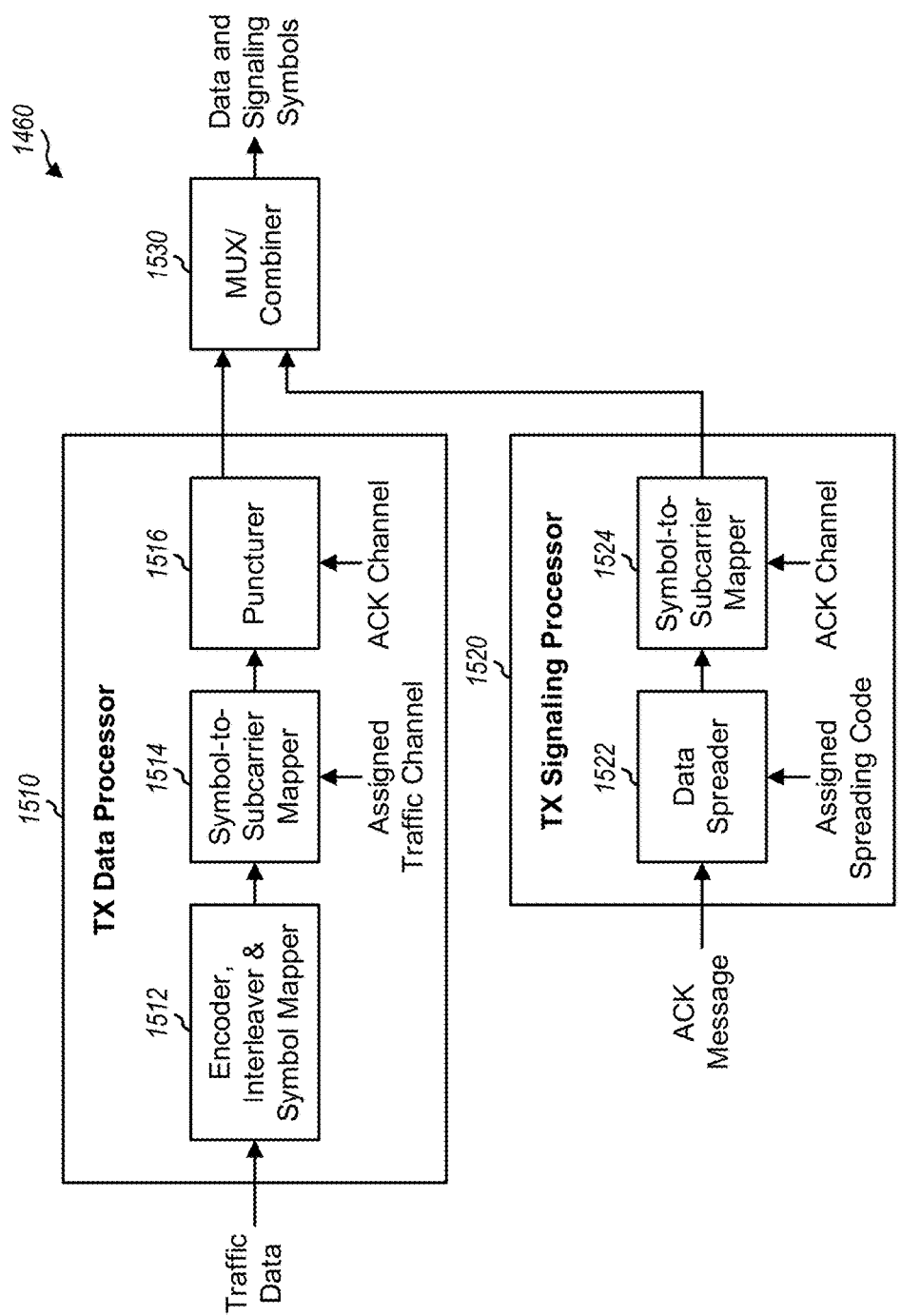
FIG. 15 shows a block diagram of a transmit data and signaling processor.

FIG. 15 shows a block diagram of an embodiment of TX data and signaling processor 1460 at terminal 120. Processor 1460 includes a TX data processor 1510, a TX signaling processor 1520, and a multiplexer (MUX)/combiner 1530.

Within TX data processor 1510, a unit 1512 encodes, interleaves, and symbol maps traffic data and provides data symbols. A symbol-to-subcarrier mapper 1514 maps the data symbols to the time-frequency blocks for a traffic channel assigned to terminal 120. A puncturer 1516 punctures data symbols that are mapped to time-frequency segments for the ACK channel and provides the unpunctured data symbols.

Within TX signaling processor 1520, a data spreader 1522 spreads an ACK message with a spreading code assigned to terminal 120 and provides ACK chips. For the embodiment shown in FIG. 15, the spreading is performed in the frequency domain, and data spreader 1522 provides the ACK chips as signaling symbols. In another embodiment, which is not shown in FIG. 15, the spreading is performed in the time domain, and a DFT unit transforms the ACK chips for each symbol period to the frequency domain and provides the signaling symbols. For both embodiments, a symbol-to-subcarrier mapper 1524 maps the signaling symbols to the proper clusters in the time-frequency segments for the ACK channel. Unit 1530 combines the data symbols from processor 1510 and the signaling symbols from processor 1520 and provides the mapped data and signaling symbols.

Figure 16:
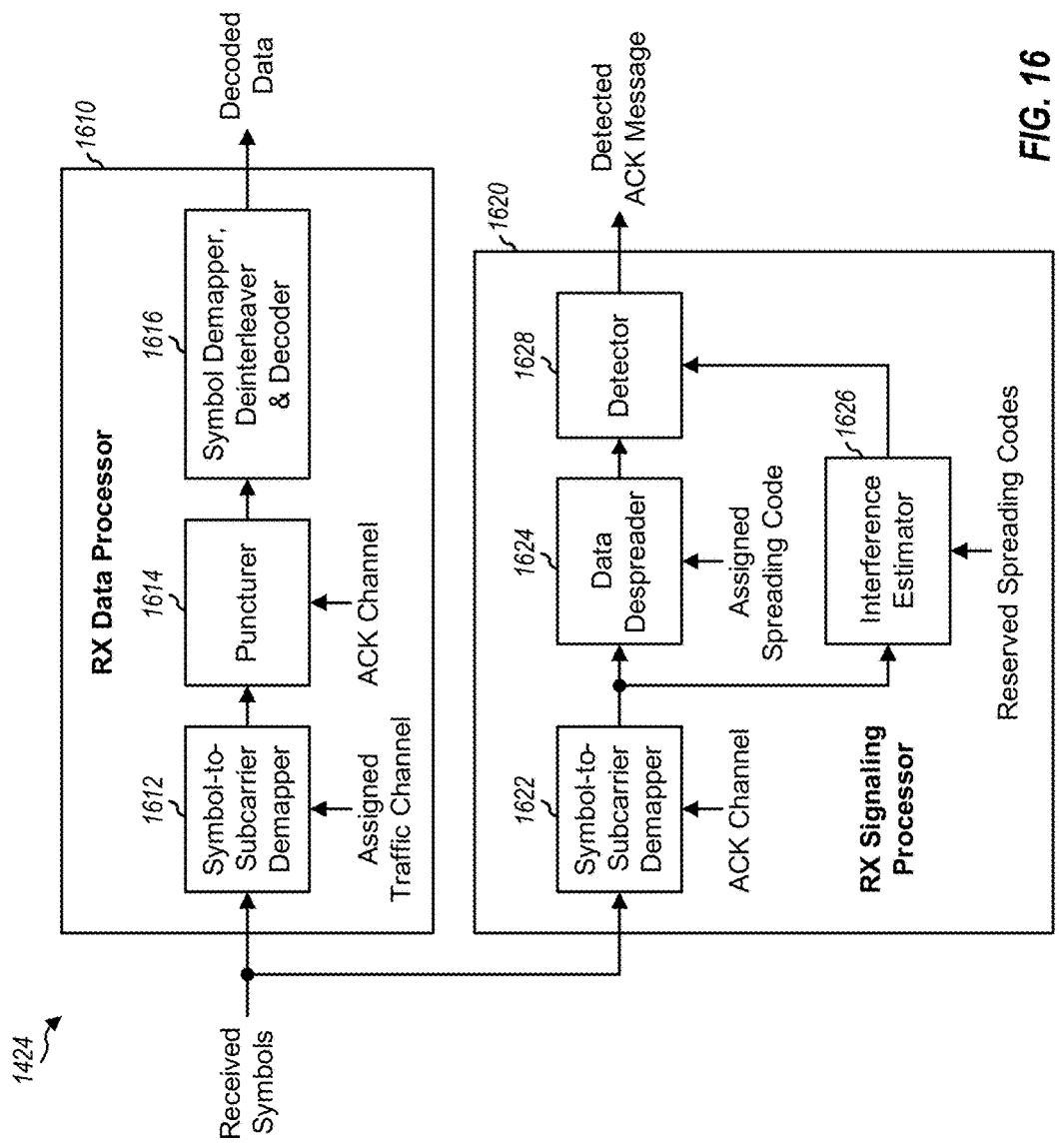
FIG. 16 shows a block diagram of a receive data and signaling processor.

FIG. 16 shows a block diagram of an embodiment of RX data and signaling processor 1424 at base station 110. Processor 1424 includes an RX data processor 1610 and an RX signaling processor 1620. For clarity, the processing to recover traffic data and signaling from one terminal u (e.g., terminal 120 in FIGS. 14 and 15) is described below.

Within RX data processor 1610, a symbol-to-subcarrier demapper 1612 extracts received symbols from the time-frequency blocks for the traffic channel assigned to terminal 120. A puncturer 1614 punctures the received symbols extracted from the time-frequency segments for the ACK channel and provides the unpunctured received symbols. A unit 1616 symbol demaps, deinterleaves, and decodes the unpunctured received symbols and provides decoded data for terminal 120.

Within RX signaling processor 1620, a symbol-to-subcarrier demapper 1622 extracts received symbols from the time-frequency segments for the ACK channel. If the spreading is performed in the frequency domain, then an IDFT unit transforms the received symbols for each symbol period to the time domain and provides time-domain samples for despreading (not shown in FIG. 16). If the spreading is performed in the frequency domain, which is shown in FIG. 16 and assumed for the description below, then demapper 1622 provides the received symbols for despreading. A data despreader 1624 despreads the received symbols from each cluster with the spreading code assigned to terminal 120, as follows:

$$z_{u,c} = \sum_i r_{c,i} \cdot w_{u,i}, \qquad \text{Eq (4)}$$

where $r_{c,i}$ is the i-th received symbol from cluster c; and
$z_{u,c}$ is a despread symbol from cluster c for terminal u.

An interference estimator 1626 despreads the received symbols from each cluster with each reserved spreading code as follows:

$$z_{j,c} = \sum_i r_{c,i} \cdot w_{j,i}, \quad \text{for } j \in RC \qquad \text{Eq (5)}$$

where $z_{j,c}$ is a despread symbol for reserved spreading code j; and
RC is a set of all reserved spreading codes.

Interference estimator 1626 then derives an interference estimate for each cluster by summing the squared magnitude of the despread symbols for the reserved spreading codes, as follows:

$$I_{0,c} = \sum_{j \in RC} |z_{j,c}|^2, \qquad \text{Eq (6)}$$

where $I_{0,c}$ is the interference estimate for cluster c.

A detector 1628 performs detection for the ACK message sent by terminal 120 based on the despread symbols and the interference estimates for all clusters, as follows:

$$A_u = \sum_c \frac{|z_{u,c}|^2}{I_{0,c}}, \quad \text{and} \qquad \text{Eq (7)}$$

$$ACK_u = \begin{cases} \text{'1'} & A_u > A_{th}, \\ \text{'0'} & \text{otherwise}, \end{cases} \qquad \text{Eq (8)}$$

where $A_{th}$ is a threshold used for detecting an ACK bit and $ACK_u$ is the detected ACK message for terminal 120. Equation (7) computes the energy of the despread symbol for the ACK bit for each cluster, scales the symbol energy for each cluster based on the interference estimate for that cluster, and combines the weighted results for all clusters used to send the ACK bit.

The ACK detection may also be performed in other manners. In another embodiment, base station 110 performs ACK detection with interference cancellation. For example, base station 110 may detect the ACK bit for the strongest received terminal, estimate the interference due to this terminal, subtract the estimated interference from the received symbols, and detect the ACK bit for the next strongest received terminal based on the interference-canceled received symbols. In yet another embodiment, base station 110 performs coherent ACK detection. For this embodiment, base station 110 derives a channel estimate for each terminal based on a pilot sent by that terminal and performs ACK detection with the channel estimate.

The signaling transmission techniques described herein may be implemented by various means. For example, these techniques may be implemented in hardware, firmware, software, or a combination thereof. For a hardware implementation, the processing units at a terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a base station may also be implemented within one or more ASIC, DSPs, processors, and so on.

For a firmware and/or software implementation, the techniques may be implemented with modules (e.g., procedures, functions, and so on) that perform the functions described herein. The software codes may be stored in a memory (e.g., memory 1432 or 1472 in FIG. 14) and executed by a processor (e.g., processor 1430 or 1470). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Further, time-frequency segments are exemplary resources that may be assigned for signaling and data. The time-frequency segments may also comprise frequency subcarriers, transmission symbols, or other resources, in addition to time frequency segments.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to map signaling of an acknowledgement message for at least one received data transmission to resources of a traffic channel for wireless communications by reassigning a portion of the traffic channel such that the portion of the traffic channel is used for transmitting the acknowledgement message, the traffic channel being mapped to a sequence of time-frequency blocks that hop across frequency in different time intervals to identify that the portion of the traffic channel is reassigned for transmitting the acknowledgement message, and the acknowledgement message being a 1-bit acknowledgement message conveyed by a plurality of symbols via the portion of the traffic channel, and to encode a plurality of bits corresponding to the acknowledgment message separately from traffic data of the traffic channel; and
a memory coupled to the at least one processor.

2. The apparatus of claim 1, wherein the at least one processor is configured to determine the resources for the signaling of the acknowledgement message based on a frequency hopping pattern.

3. The apparatus of claim 1,
wherein the at least one processor is configured to spread the signaling of the acknowledgement message with a spreading code to convey the 1-bit acknowledgement message using the plurality of symbols, and
wherein the spreading code is derived from a Hadamard matrix or a Fourier matrix.

4. The apparatus of claim 1,
wherein the resources comprise multiple time-frequency segments, and
wherein the at least one processor is configured to, when mapping the signaling of the acknowledgement message to the resources, map the signaling of the acknowledgement message to the multiple time-frequency segments in the portion of the traffic channel.

5. The apparatus of claim 4, wherein the signaling of the acknowledgement message observes interference from a different set of transmitters in each of the multiple time-frequency segments.

6. The apparatus of claim 4, wherein the multiple time-frequency segments cover different frequency subcarriers.

7. The apparatus of claim 4,
wherein the resources comprise multiple time-frequency segments that each comprise multiple clusters, and
wherein the at least one processor is configured to map the signaling of the acknowledgement message to clusters covering different time intervals in the multiple time-frequency segments.

8. A method comprising:
mapping signaling of an acknowledgement message for at least one received data transmission to resources of a traffic channel for wireless communications by reassigning a portion of the traffic channel such that the portion of the traffic channel is used for transmitting the acknowledgement message, the traffic channel being mapped to a sequence of time-frequency blocks that hop across frequency in different time intervals to identify that the portion of the traffic channel is reassigned for transmitting an acknowledgement message;
mapping the resources for the signaling of the acknowledgement message so that the portion of the traffic channel is reassigned from the traffic channel such that a transmitter and a receiver are able to identify when the portion of the traffic channel is reassigned for transmitting the acknowledgement message, wherein the acknowledgement message is a 1-bit acknowledgement message conveyed by a plurality of symbols via the portion of the traffic channel; and
encoding a plurality of bits corresponding to the acknowledgment message separately from traffic data of the traffic channel.

9. The method of claim 8, further comprising determining the resources for the signaling of the acknowledgement message based on a frequency hopping pattern.

10. The method of claim 8, further comprising spreading the signaling of the acknowledgement message with a spreading code to convey the 1-bit acknowledgement message using the plurality of symbols,
wherein the spreading code is derived from a Hadamard matrix or a Fourier matrix.

11. The method of claim 8,
wherein the resources comprise multiple time-frequency segments, and wherein mapping the signaling of the acknowledgement message to the resources comprises mapping the signaling of the acknowledgement message to the multiple time frequency segments in the portion of the traffic channel.

12. The method of claim 11, wherein the signaling of the acknowledgement message observes interference from a different set of transmitters in each of the multiple time-frequency segments.

13. The method of claim 11, wherein the multiple time-frequency segments cover different frequency subcarriers.

14. The method of claim 11,
wherein the resources comprise multiple time-frequency segments that each comprise multiple clusters, and
wherein mapping the signaling of the acknowledgement message comprises mapping the signaling message to clusters covering different time intervals in the multiple time-frequency segments.

15. An apparatus comprising:
means for mapping signaling of an acknowledgement message for at least one received data transmission to resources of a traffic channel by reassigning a portion of the traffic channel such that the portion of the traffic channel is used for transmitting the acknowledgement message, the traffic channel being mapped to a sequence of time-frequency blocks that hop across frequency in different time intervals to identify that the portion of the traffic channel is reassigned for transmitting the acknowledgement message;
means for mapping the resources for the signaling of an acknowledgement message so that the portion of the traffic channel is reassigned from the traffic channel such that a transmitter and a receiver are able to identify when the portion of the traffic channel is reassigned for transmitting the acknowledgement message, wherein the acknowledgement message is a 1-bit acknowledgement message conveyed by a plurality of symbols via the portion of the traffic channel; and
means for encoding a plurality of bits corresponding to the acknowledgment message separately from traffic data of the traffic channel.

16. The apparatus of claim 15, further comprising means for determining the resources for the signaling of the acknowledgement message based on a frequency hopping pattern.

17. The apparatus of claim 15, further comprising means for spreading the signaling of the acknowledgement message with a spreading code to convey the 1-bit acknowledgement message using the plurality of symbols,
wherein the spreading code is derived from a Hadamard matrix or a Fourier matrix.

18. The apparatus of claim 15,
wherein the signaling of the acknowledgement message observes interference from a different set of transmitters in each of the multiple time-frequency segments,
wherein the resources comprise multiple time-frequency segments that cover different frequency subcarriers, and
wherein the means for mapping the signaling of the acknowledgement message to the resources comprises means for mapping the signaling of the acknowledgement message to the multiple time frequency segments.

19. The apparatus of claim 15,
wherein the resources comprise time-frequency segments that each comprise multiple clusters, and
wherein mapping the signaling messages comprise mapping the signaling of the acknowledgement message to clusters covering different time intervals in the multiple time-frequency segments.

20. A non-transitory processor readable media comprising instructions which executed by a processor, cause the processor to:
map signaling of an acknowledgement message for at least one received data transmission to resources of a traffic channel for wireless communications by reassigning a portion of the traffic channel such that the portion of the traffic channel is used for transmitting the acknowledgement message, the traffic channel being mapped to a sequence of time-frequency blocks that hop across frequency in different time intervals to identify that the portion of the traffic channel is reassigned for transmitting the acknowledgement message;
map the resources for the signaling of an acknowledgement message so that the portion of the traffic channel is reassigned from the traffic channel such that a transmitter and a receiver are able to identify when the portion of the traffic channel is reassigned for transmitting the acknowledgement message, wherein the acknowledgement message is a 1-bit acknowledgement message conveyed by a plurality of symbols via the portion of the traffic channel; and
encode a plurality of bits corresponding to the acknowledgment message separately from traffic data of the traffic channel.

* * * * *